United States Patent [19]
Ohmori

[11] Patent Number: 5,881,173
[45] Date of Patent: Mar. 9, 1999

[54] BIT-PLANE CODING DEVICE

[75] Inventor: Masatake Ohmori, Zama, Japan

[73] Assignee: Ricoh Company, Ltd., Tokyo, Japan

[21] Appl. No.: 655,678

[22] Filed: May 30, 1996

[30] Foreign Application Priority Data

Jun. 5, 1995 [JP] Japan .................................. 7-160132
Dec. 12, 1995 [JP] Japan .................................. 7-346139

[51] Int. Cl.⁶ .................................................. G06K 9/36
[52] U.S. Cl. ........................................................ 382/232
[58] Field of Search .................................. 382/232, 233,
382/234, 239, 240, 243, 237, 238; 348/396;
358/261.1, 261.2, 426, 429, 443, 455, 456

[56] References Cited

U.S. PATENT DOCUMENTS

| | | | |
|---|---|---|---|
| 4,745,743 | 5/1988 | Hall | 348/396 |
| 5,091,977 | 2/1992 | Katata et al. | 358/261.1 |
| 5,335,088 | 8/1994 | Fan | 358/429 |
| 5,471,207 | 11/1995 | Zandi et al. | 382/232 |
| 5,631,977 | 5/1997 | Koshi et al. | 382/239 |
| 5,659,631 | 8/1997 | Gormish et al. | 382/233 |

FOREIGN PATENT DOCUMENTS 5-300382  11/1993  Japan .

*Primary Examiner*—Jose L. Couso
*Attorney, Agent, or Firm*—Oblon, Spivak, McClelland, Maier & Neustadt, P.C.

[57] ABSTRACT

A device encodes a multi-level image by coding bit planes obtained from the multi-level image. The device includes a gray-code-conversion unit converting the multi-level image into a gray-code representation, a bit-plane generating unit generating the bit planes from the gray-code representation, a data-reference unit extracting a current pixel and fixed reference pixels from a first one of the bit planes and extracting a floating reference pixel from a second one of the bit planes including the first one, and a coding unit coding a sequence of pixels extracted sequentially from the bit planes by using an entropy coding method. The entropy coding method uses as a coding parameter a probability of data occurrence of the current pixel, the probability of data occurrence being obtained based on the fixed reference pixels and the floating reference pixel.

22 Claims, 29 Drawing Sheets

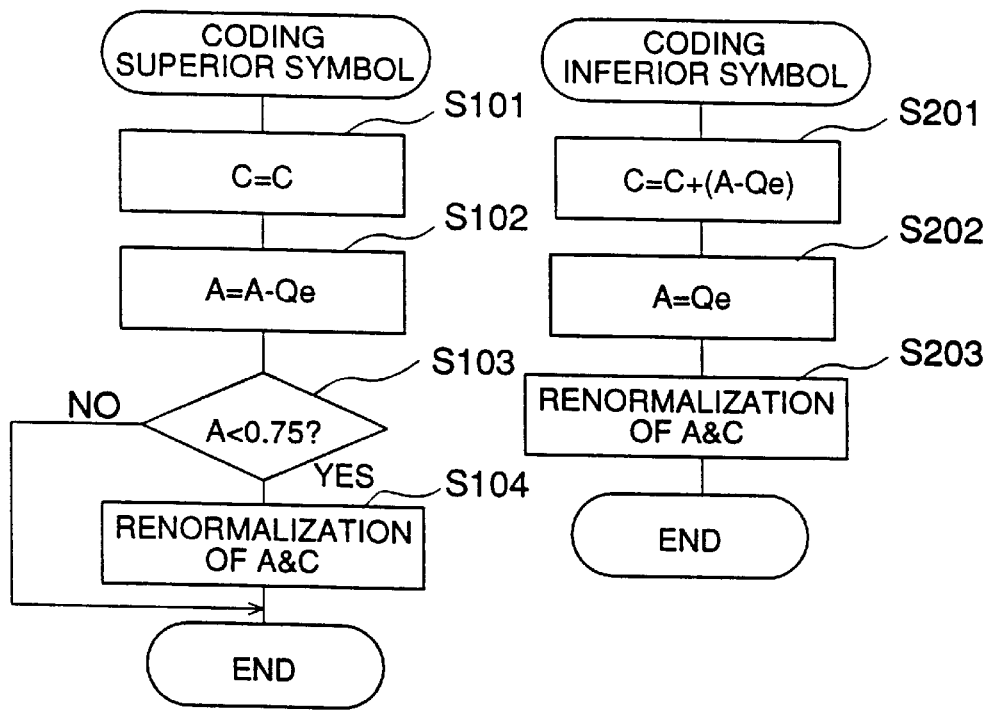
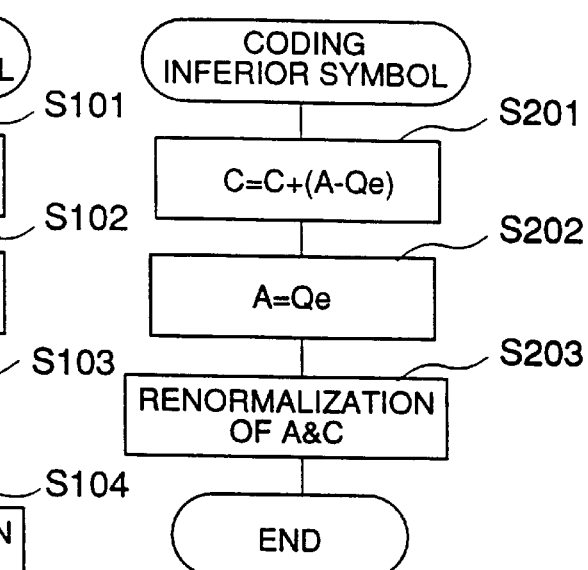
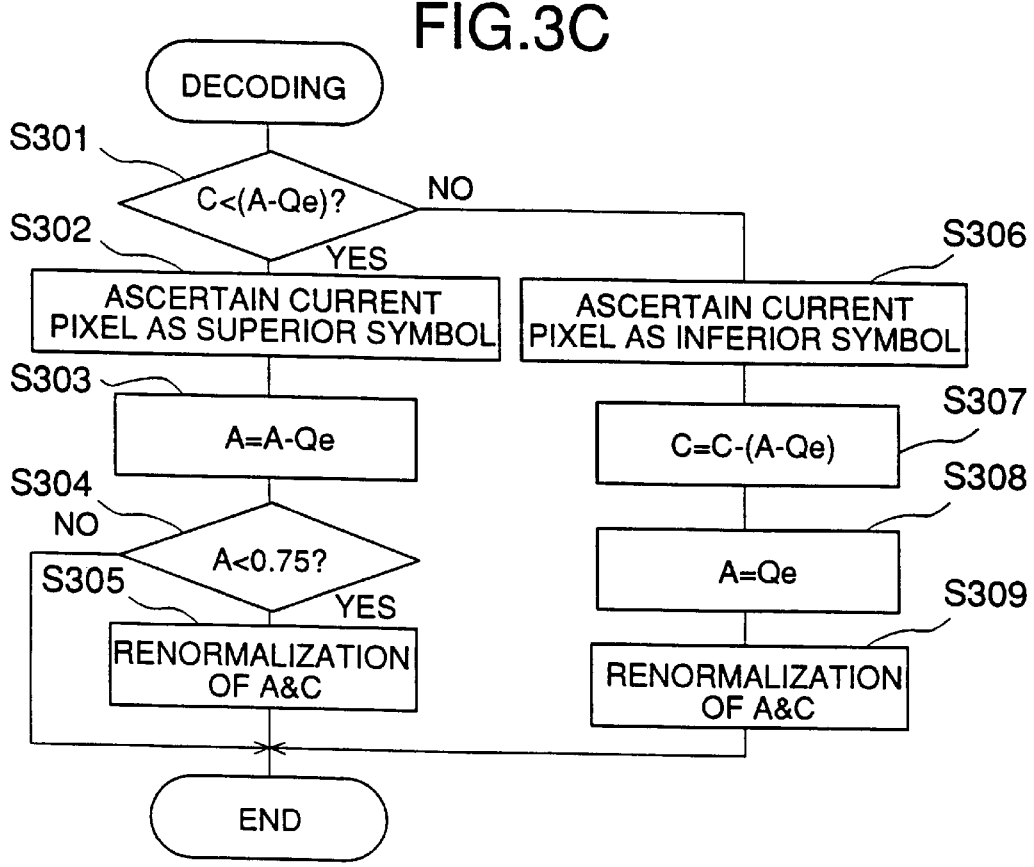

FIG.12A
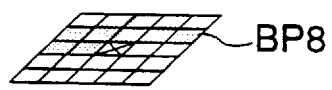
FIG.12B
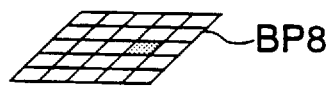
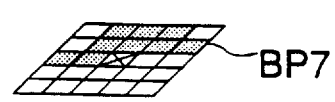
FIG.12C
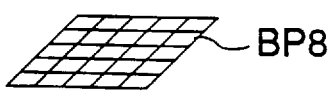
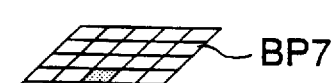
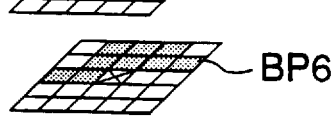
FIG.12D
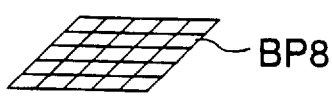
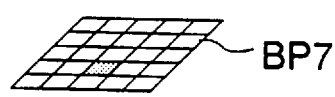
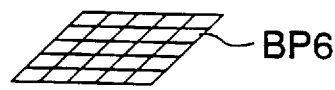
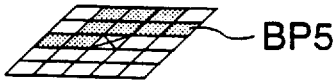
FIG.12E
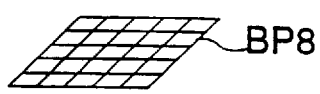
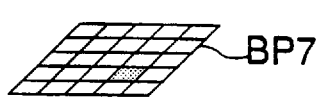
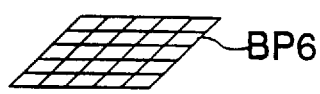
FIG.12F
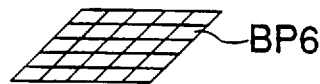
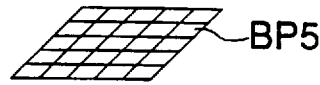
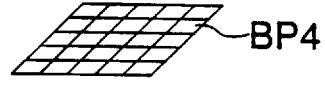
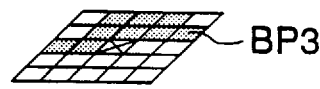

FIG.13A
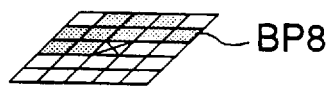
BP8
FIG.13B
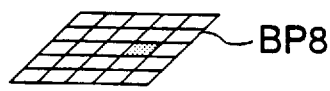
BP8
BP7
FIG.13C
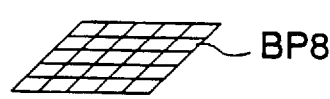
BP8
BP7
BP6
FIG.13D
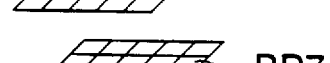
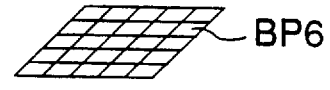
BP8
BP7
BP6
BP5
FIG.13E
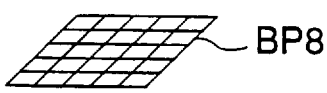
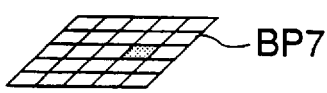
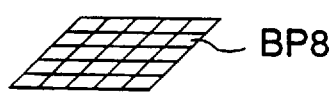
BP8
BP7
BP6
BP5
BP4
FIG.13F
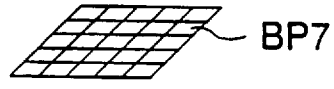
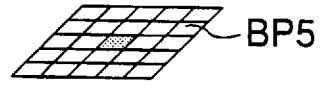
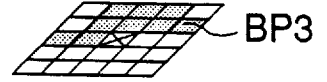
BP8
BP7
BP6
BP5
BP4
BP3

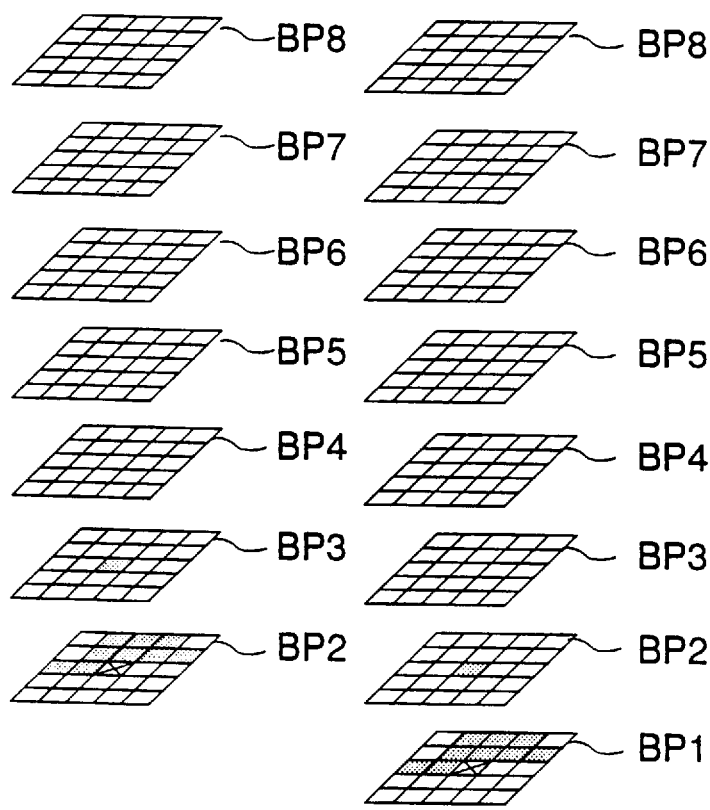

FIG.14A
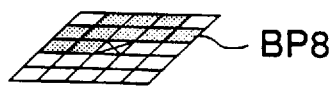
BP8
FIG.14B
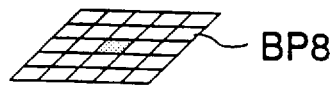
BP8
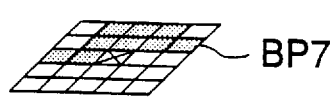
BP7
FIG.14C
BP8
BP7
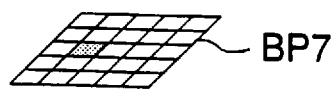
BP6
FIG.14D
BP8
BP7
BP6
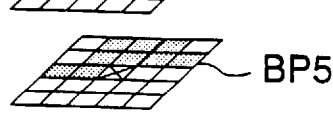
BP5
FIG.14E
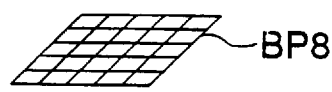
BP8
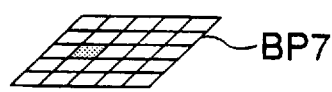
BP7
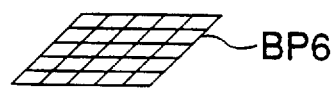
BP6
BP5
BP4
FIG.14F
BP8
BP7
BP6
BP5
BP4
BP3

FIG.16A
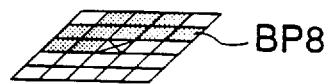
FIG.16B
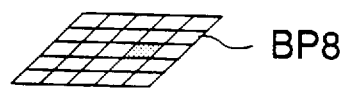
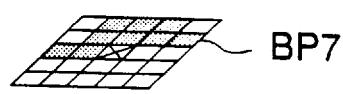
FIG.16C
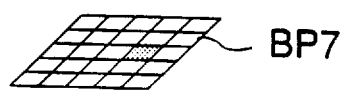
FIG.16D
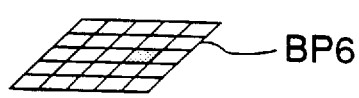
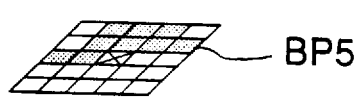
FIG.16E
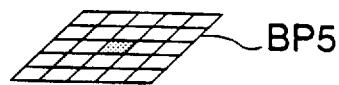
FIG.16F
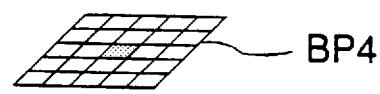
FIG.16G
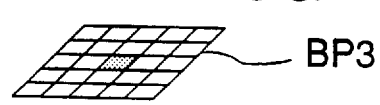
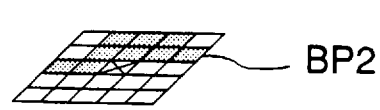
FIG.16H

FIG.17A
FIG.17E
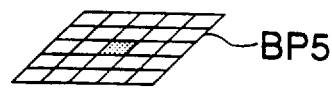
FIG.17B
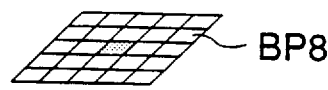
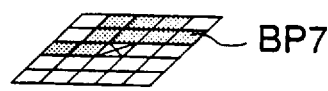
FIG.17F
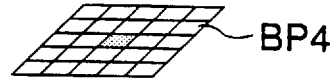
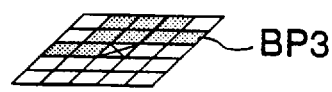
FIG.17C
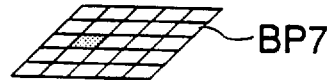
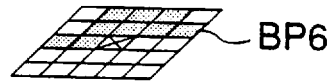
FIG.17G
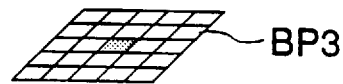
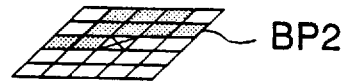
FIG.17D
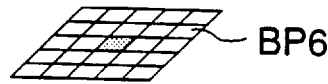
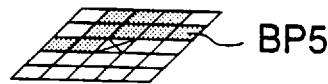
FIG.17H
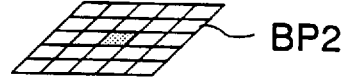
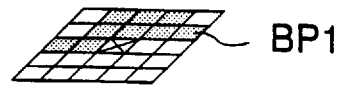

FIG.21A
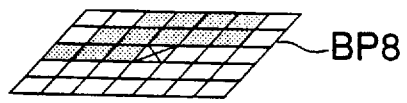
FIG.21B
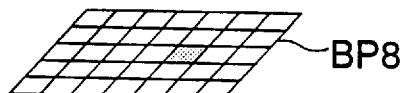
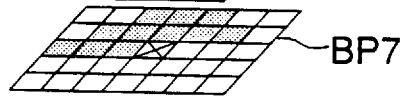
FIG.21C
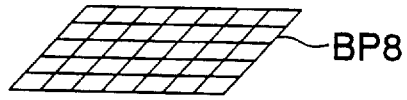
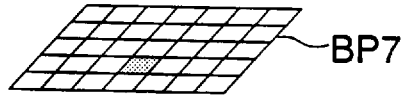
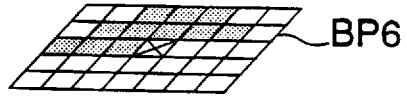
FIG.21D
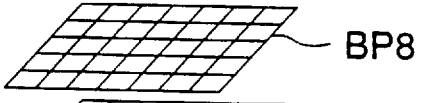
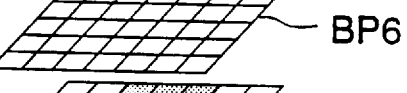
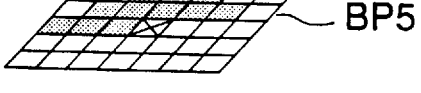
FIG.21E
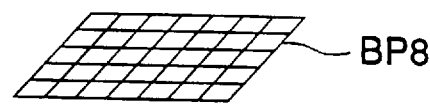
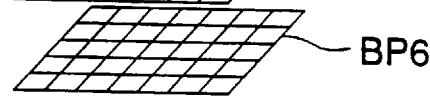
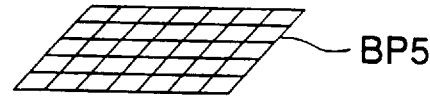
FIG.21F
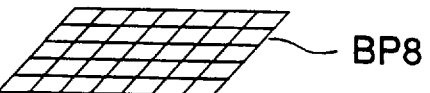
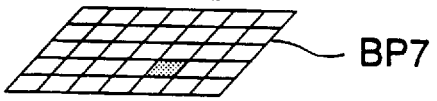
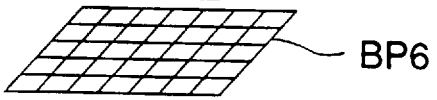
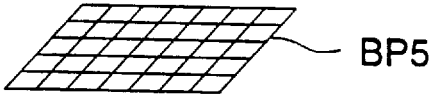
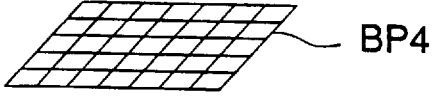
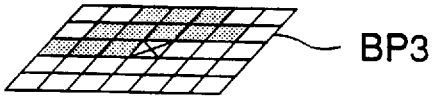

FIG.22A
 BP8
FIG.22B
 BP8
 BP7
FIG.22C
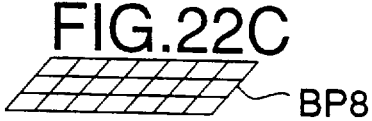 BP8
 BP7
 BP6
FIG.22D
 BP8
 BP7
 BP6
 BP5
FIG.22E
 BP8
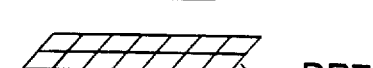 BP7
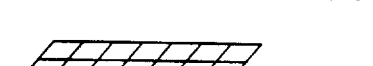 BP6
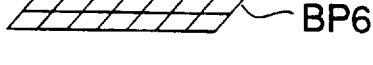 BP5
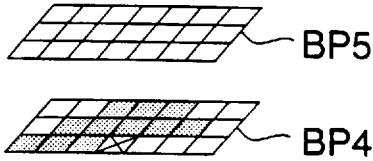 BP4
FIG.22F
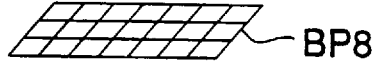 BP8
 BP7
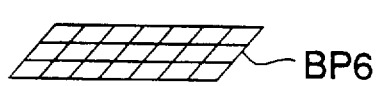 BP6
 BP5
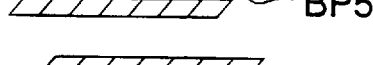 BP4
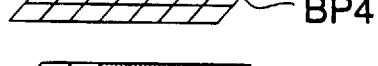 BP3

FIG.23A
 BP8
FIG.23B
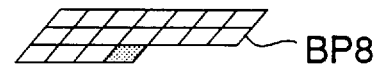 BP8
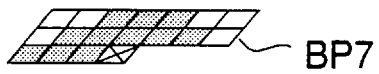 BP7
FIG.23C
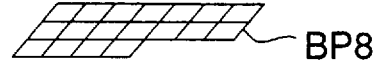 BP8
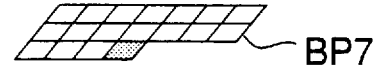 BP7
 BP6
FIG.23D
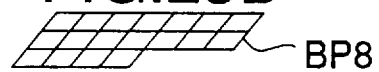 BP8
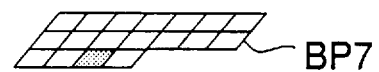 BP7
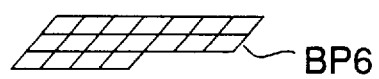 BP6
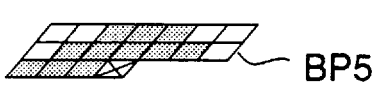 BP5
FIG.23E
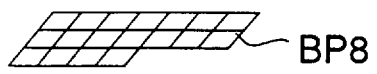 BP8
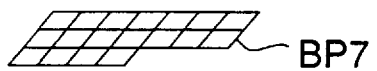 BP7
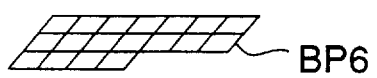 BP6
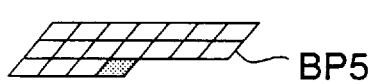 BP5
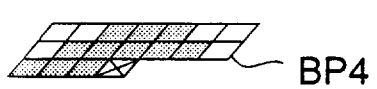 BP4
FIG.23F
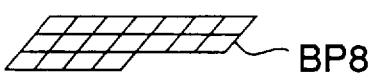 BP8
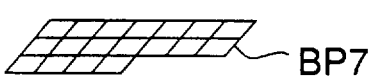 BP7
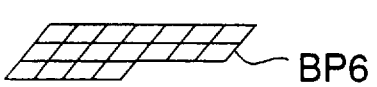 BP6
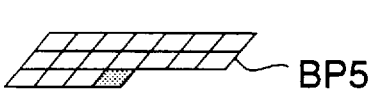 BP5
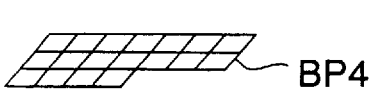 BP4
 BP3

BP8

BP8
BP7

BP7
BP6

BP6
BP5

BP5
BP4

BP4
BP3

BP3
BP2

BP2
BP1

BP8

BP8
BP7

BP7
BP6

BP6
BP5

BP5
BP4

BP4
BP3

BP3
BP2

BP2
BP1

BIT-PLANE CODING DEVICE

BACKGROUND OF THE INVENTION

1. Field of Invention

The present invention generally relates to coding devices, and particularly relates to a coding device which compresses an image through coding of the image.

2. Description of the Related Art

A recent diversification of data communication and data processing has created demands for facsimile devices having data-exchange functions and personal computers capable of treating black-and-white-multi-level images and color-multi-level images. The black-and-white-multi-level images are comprised of a plurality of bits assigned to each pixel, and the color-multi-level images are comprised of a plurality of color components, each of which is represented by a plurality of bits assigned to each pixel.

As is well known, an image contains an enormous amount of data. An attempt to process this enormous amount of data will result in a hefty memory volume required for storage of data and in an excessively lengthy processing time. To avoid this, image data is generally compressed through a coding scheme, so that data communication and storage of data can be conducted with a reduced amount of data. Since the black-and-white-multi-level images and the color-multi-level images have a large number of bits per pixel, a coding scheme for effective coding and effective compression is required for these images.

There are two types of image coding schemes for coding and compressing the black-and-white-multi-level images. One of these is a method which treats a plurality of bits per pixel as one unit of data as in accordance with the JPEG. The other is a method which extracts a bit of the same order from a black-and-white-multi-level image for each pixel to create bit planes and applies a binary coding scheme to each bit plane to encode and compress the original image. The latter method is called a bit-plane coding method. In this bit-plane coding method, the MH (modified Huffman) method, the MR (modified Read) method, the MMR (modified modified-Read) method, the JBIG (Joint Bi-level Image coding expert Group) method, etc., is used as the binary coding scheme.

FIG. 1 is an illustrative drawing showing a relation between the bit planes and the original image. As shown in FIG. 1, when a multi-level image comprising eight bits per pixel is to be coded by the bit-plane coding method, for example, the eighth bits of the original image are extracted to form a bit plane BP8, the seventh bits of the original image are extracted to form a bit plane BP7, and so on.

Each of the bit planes BP8 through BP1 created in this manner can be treated as binary image data. Recently, the JBIG method has been attracting attention as an highly efficient compression method for binary image data.

The JBIG method is based on an assumption that an image can be modeled by the Markov process, and encodes a current pixel according to a state thereof. Namely, a plurality of reference pixels surrounding the current pixel are extracted by using a model template, and the state of the current pixel is predicted based on the bit pattern of the reference pixels. Then, the QM-coder coding process is applied based on the predicted probability to code and compress the binary image data.

In the following, arithmetic codes forming a foundation of the QM-coder coding method will be described.

An arithmetic code of a given symbol sequence is obtained by determining a range corresponding to the given symbol sequence within a range [0, 1) and by representing a point in the range as a binary decimal. The determination of the range is made by starting from the range [0, 1) and recursively dividing a range based on a probability of occurrence of each symbol.

FIG. 2 is an illustrative drawing for explaining a binary arithmetic coding method. FIG. 2 shows a procedure in which a symbol sequence "0100" is coded.

In FIG. 2, when a first symbol "0" of the symbol sequence "0100" is to be coded, the range [0, 1) is divided into two ranges A(0) and A(1) in proportion to probabilities of occurrence of symbols "0" and "1". Since the first symbol is "0", the range A(0) is selected. When a second symbol "1" of the symbol sequence "0100" is to be coded, the range A(0) is divided into two ranges A(00) and A(01) in proportion to conditional probabilities of occurrence of the symbol "0" and "1" under the condition that the preceding symbol is "0". Since the first two symbols are "01", the range A(01) is selected. The division of a range and the selection of a divided range are carried out for the coding of the symbol sequence.

The arithmetic coding method described here is a non-block coding method, and is suitable when the probabilities of occurrence of symbols (black or white) are dependent on the conditions (contexts) as in a predicting coding method. Also, the arithmetic coding method needs a relatively small amount of hardware for the coding unit and the memory unit, compared to the run-length coding method such as the MH coding method. Furthermore, the arithmetic coding method can achieve a high efficiency in the coding, and can be relatively easily implemented.

The QM-coder coding method mentioned above employs the arithmetic coding method with a smaller amount of hardware at a higher processing speed. In general, image data is not directly subjected to the arithmetic coding method. Namely, a decision as to whether each pixel of the image data is a superior symbol or an inferior symbol is made in advance based on the predicting coding process. The inferior symbol is a symbol having the lowest probability of occurrence in a given context, and the superior symbol is a symbol having the highest probability of occurrence in the given context. Therefore, a decision as to which one of the superior symbol and the inferior symbol is a white pixel or a black pixel is statistically made based on the context.

In the following, a coding/decoding algorithm of the QM-coder coding method will be described.

The coding starts with the range [0, 1) (i.e., a range greater than or equal to 0 and smaller than 1). The range has a length A, and the inferior symbol has a probability Qe of the occurrence thereof under a given Markov state (i.e., Markov state 0 for the initial condition). Ranges obtained by dividing the range are given as:

$$a = A \cdot (1 - Qe) \qquad (1)$$

$$b = A \cdot Qe \qquad (2)$$

where a is a length of a range corresponding to the superior symbol and b is a length of a range corresponding to the inferior symbol. If the first symbol is the superior symbol (e.g., 0), the range a is newly assigned as the range A. If the first symbol is the inferior symbol (e.g., 1), the range b is assigned as the range A. Then, further divisions are made for the following symbols. For this process, a coding table is provided to store relations between the probability Qe and a state number indicating a Markov state and to store information on state transitions at a time of a renormalization process (which will be described later).

Multiplication operations required in the equations (1) and (2) are disadvantageous in terms of the hardware size and the processing speed. Also, if a code sequence having an infinite length is to be coded, infinite-size operation registers are necessary for the calculation of infinitesimally small ranges.

To overcome the above-identified problems, the QM-coder coding method manipulates the process such that a newly assigned range A ranges from 0.75 to 1.5 to approximate the range A to 1. Also, the equations (1) and (2) are approximated by:

$$a = A - Qe \quad (3)$$

$$b = Qe \quad (4)$$

When A becomes smaller than 0.75, A is bit-shifted to the left such that A becomes greater than or equal to 0.75 and smaller than 1.5. This is the renormalization process. The renormalization process makes it possible to use a subtraction operation instead of the multiplication operations and to use finite-size operation registers. After the renormalization process, a transition to a next Markov state is made based on the current Markov state and a decision as to the current symbol is the superior symbol or the inferior symbol.

FIG. 3A is a flowchart of a process of coding the superior symbol, and FIG. 3B is a flowchart of a process of coding the inferior symbol. In these figures, C represents a code, and an initial value thereof is zero.

When the superior symbol is to be coded, at a step S101, the code C is not modified.

At a step S102, the range A is updated by subtracting the probability Qe corresponding to the current Markov state from A.

At a step S103, a check is made whether the range A is smaller than 0.75. If it is smaller, the procedure goes to a step S104. Otherwise, the procedure skips the step S104.

At a step S104, the range A and the code C are subjected to the renormalization process, and a state transition is made. If the step S104 is skipped as a result of the check at the step S103, the current Markov state is maintained. This ends the procedure for the coding of the superior symbol.

When the inferior symbol is to be coded, at a step S201, the code C is incremented by (A−Qe).

At a step S202, the range A is updated to the probability Qe.

At a step S203, the range A and the code C are subjected to the renormalization process, and a state transition is made.

The code C thus generated corresponds to a binary decimal value indicating the lowest point within the range. The renormalization process bit-shifts the code C to the left by the same number of digits as for the range A, and a portion of the code C exceeding 1 is output as coded data.

FIG. 3C is a flowchart of a decoding process.

At a step S301, a check is made whether the code C is smaller than (A−Qe). If it is smaller, the procedure goes to a step S302. Otherwise, the procedure goes to a step S306.

At the step S302, it is ascertained that the current pixel to be decoded is a superior pixel.

At a step S303, the range A is updated by decreasing A by the probability Qe corresponding to the current Markov state.

At a step S304, a check is made whether A is smaller than 0.75. If it is smaller, the procedure goes to a step S305. Otherwise, the procedure skips the step S305.

At the step S305, the range A and the code C are subjected to the renormalization process, and a state transition is made.

If the step S305 is skipped as a result of the check at the step S304, the current Markov state is maintained. This ends the procedure for the decoding of the current symbol.

At the step S306 which is one of the branches after the check at the S301, it is ascertained that the current pixel is an inferior symbol.

At a step S307, the code C is updated by decreasing the code C by (A−Qe).

At a step S308, the range A is updated to the value of the probability Qe.

At a step S309, the range A and the code C are subjected to the renormalization process, and a state transition is made. This ends the procedure for the decoding of the symbol.

In this manner, when a superior symbol occurs, the code C does not change at the time of coding, so that the chance of the renormalization process being required is low. When an inferior symbol appears, the renormalization process is conducted and the coded data is generated.

Accordingly, a predicting coding method which assigns a symbol of the lowest probability to the inferior symbol enhances the coding efficiency and the processing speed.

FIG. 4 is a block diagram of a coding device which encodes and compresses multi-level-image data by using the JBIG method.

In FIG. 4, the coding device includes an image inputting unit 1, a bit-plane generating unit 2, a bit-plane memory 3, a data-reference unit 4, and a arithmetic coding unit 7. The arithmetic coding unit 7 includes an arithmetic coding engine (unit) 5 and a probability estimating unit 6.

The image inputting unit 1 receives multi-level-image data comprised of eight bits per pixel, for example. The image data is supplied to the bit-plane generating unit 2 from the image inputting unit 1. The bit-plane generating unit 2 expands the multi-level-image data into bit planes, and bit-plane data is stored in the bit-plane memory 3.

The data-reference unit 4 reads data of the current pixel to be coded from the bit-plane memory 3, and supplies the data as current-pixel data DX to the arithmetic coding engine 5. Also, the data-reference unit 4 reads data of a plurality of reference pixels from the bit-plane memory 3 by applying a predetermined template to the current pixel, and supplies the data as reference-pixel data DR to the probability estimating unit 6.

The probability estimating unit 6 determines the context of the current pixel based on the reference-pixel data DR. Then, the probability estimating unit 6 obtains an estimated probability of the superior symbol or the inferior symbol, and generates a symbol type indicating the superior symbol or the inferior symbol as being the symbol of the estimated probability. These results are supplied to the arithmetic coding engine 5.

The arithmetic coding engine 5 carries out the arithmetic coding process described above based on the current-pixel data DX, the estimated probability, and the symbol type. Coded data obtained from the arithmetic coding process is output from the arithmetic coding engine 5. If the renormalization process is conducted during the coding process, the arithmetic coding engine 5 informs the probability estimating unit 6 of this fact. The probability estimating unit 6 operating in synchronism with the renormalization process makes a transition of the context to update the state used for the probability estimation. Also, the probability estimating unit 6 stores 8-bit data including a value of the Markov state for each context (i.e., value of the probability estimation index comprising 7 bits) and 1 bit for indicating the superior symbol as being either black or white.

FIG. 5 is an illustrative drawing showing an example of the template used by the data-reference unit 4. The template of FIG. 5 is a so-called JBIG-default-three-line template used in the JBIG method as a default.

In FIG. 5, the current pixel is indicated by X. By using the template of FIG. 5, 10 reference pixels A through J are extracted, and the 10-bit data of these reference pixels is provided for the probability estimating unit 6 of the arithmetic coding unit 7 as the reference-pixel data DR.

The probability estimating unit 6 stores 8-bit data (i.e., the probability estimation index and the indication of the superior symbol) for each of the 1024 contexts ($2^{10}$ contexts).

When multi-level-image data of natural images are coded, use of the gray code as a representation of a gray scale of each pixel is preferable to the use of an ordinary binary number. It is empirically known that the use of the gray code can reduce the entropy of an image in each bit plane.

Accordingly, it is preferable to convert the multi-level-image data into the gray code representation prior to the generation of the bit planes BP1 through BP8. After the conversion, the bit planes BP1 through BP8 are created and subjected to the coding process. In this manner, a compression rate of the coding can often be enhanced.

Another method for enhancing the compression rate of the coding is disclosed in Japanese Patent Laid-open Application No. 5-300382. In this method, the reference pixels are extracted from the bit plane of the current pixel and other bit planes as well.

Compared to the use of the gray code prior to the generation of the bit planes, however, this method does not bring about an increase in coding efficiency.

In order to boost the coding efficiency of this method, the reference pixels may be distributed to a larger number of bit planes. In this case, however, the reference pixels are extracted from a large number of bit planes with an increased overhead of the data transfer process for the extraction of the reference pixels. This results in a slow down of the coding processing speed.

Accordingly, there is a need for a bit-plane-coding device which has an enhanced coding efficiency with as small a reduction in the coding processing speed as possible.

SUMMARY OF THE INVENTION

Accordingly, it is a general object of the present invention to provide a bit-plane-coding device which can satisfy the need described above.

It is another and more specific object of the present invention to provide a bit-plane-coding device which has an enhanced coding efficiency with as small a reduction in the coding processing speed as possible.

In order to achieve the above objects according to the present invention, a device for coding a multi-level image by coding bit planes obtained from the multi-level image includes a gray-code-conversion unit converting the multi-level image into a gray-code representation, a bit-plane generating unit generating the bit planes from the gray-code representation, a data-reference unit extracting a current pixel and fixed reference pixels from a first one of the bit planes and extracting a floating reference pixel from a second one of the bit planes including the first one, and a coding unit coding a sequence of pixels extracted sequentially from the bit planes by using an entropy coding method, the entropy coding method using as a coding parameter a probability of data occurrence of the current pixel, the probability of data occurrence being obtained based on the fixed reference pixels and the floating reference pixel.

In the above device, the multi-level-image data is converted into the gray code representation prior to the generation of the bit planes, and one of the reference pixels extracted by the template is a floating reference pixel variably selected from the bit plane of the current pixel or other bit planes depending on the situation. Therefore, the compression rate of the coding is enhanced, and, at the same time, the load of the data transfer process for extracting the floating reference pixel is relatively light to avoid a significant reduction in the coding processing speed.

Other objects and further features of the present invention will be apparent from the following detailed description when read in conjunction with the accompanying drawings.

BRIEF DESCRIPTION OF THE DRAWINGS

FIG. 3A is a flowchart of a process of coding a superior symbol;

FIG. 3B is a flowchart of a process of coding an inferior symbol;

FIG. 3C is a flowchart of a decoding process;

FIGS. 12A through 12H are illustrative drawings showing a coordinate of a floating reference pixel when the bit-plane-by-bit-plane coding order is employed;

FIGS. 13A through 13H are illustrative drawings showing a coordinate of the floating reference pixel when the line-by-line coding order is employed;

FIGS. 14A through 14H are illustrative drawings showing a coordinate of the floating reference pixel when the pixel-by-pixel coding order is employed;

FIGS. 16A through 16H are illustrative drawings showing a coordinate of the floating reference pixel according to the alternate example of the first embodiment when the line-by-line coding order is employed;

FIGS. 17A through 17H are illustrative drawings showing a coordinate of the floating reference pixel according to the alternate example of the first embodiment when the pixel-by-pixel coding order is employed;

FIGS. 21A through 21H are illustrative drawings showing a coordinate of the floating reference pixel according to the second embodiment when the bit-plane-by-bit-plane coding order is employed;

FIGS. 22A through 22H are illustrative drawings showing a coordinate of the floating reference pixel according to the second embodiment when the line-by-line coding order is employed;

FIGS. 23A through 23H are illustrative drawings showing a coordinate of the floating reference pixel according to the second embodiment when the pixel-by-pixel coding order is employed;

DETAILED DESCRIPTION OF THE PREFERRED EMBODIMENTS

In the following, embodiments of the present invention will be described with reference to the accompanying drawings.

Figure 1:
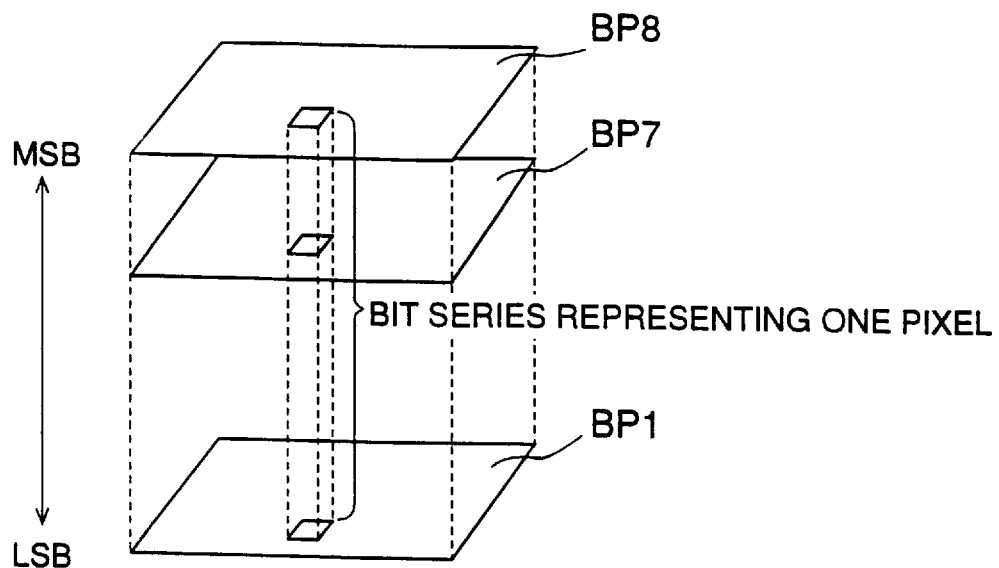
FIG. 1 is an illustrative drawing showing a relation between bit planes and an original image.
Figure 2:
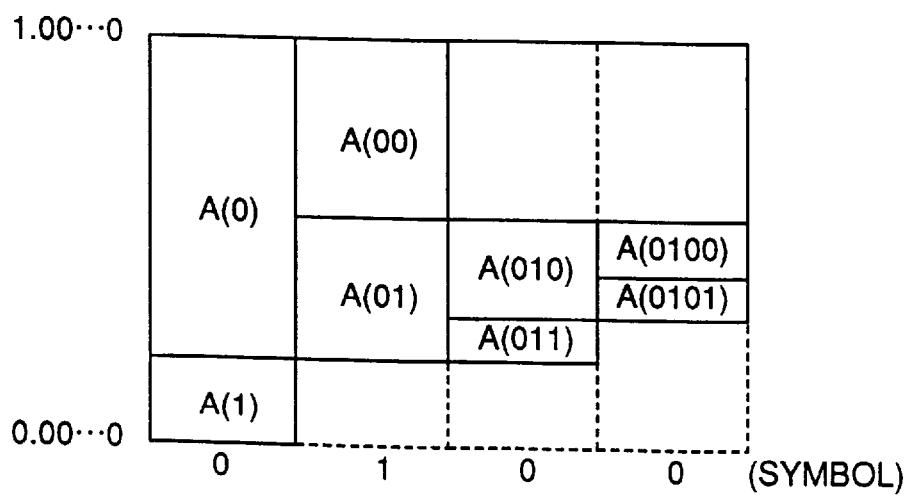
FIG. 2 is an illustrative drawing for explaining a binary arithmetic coding method.
Figure 4:
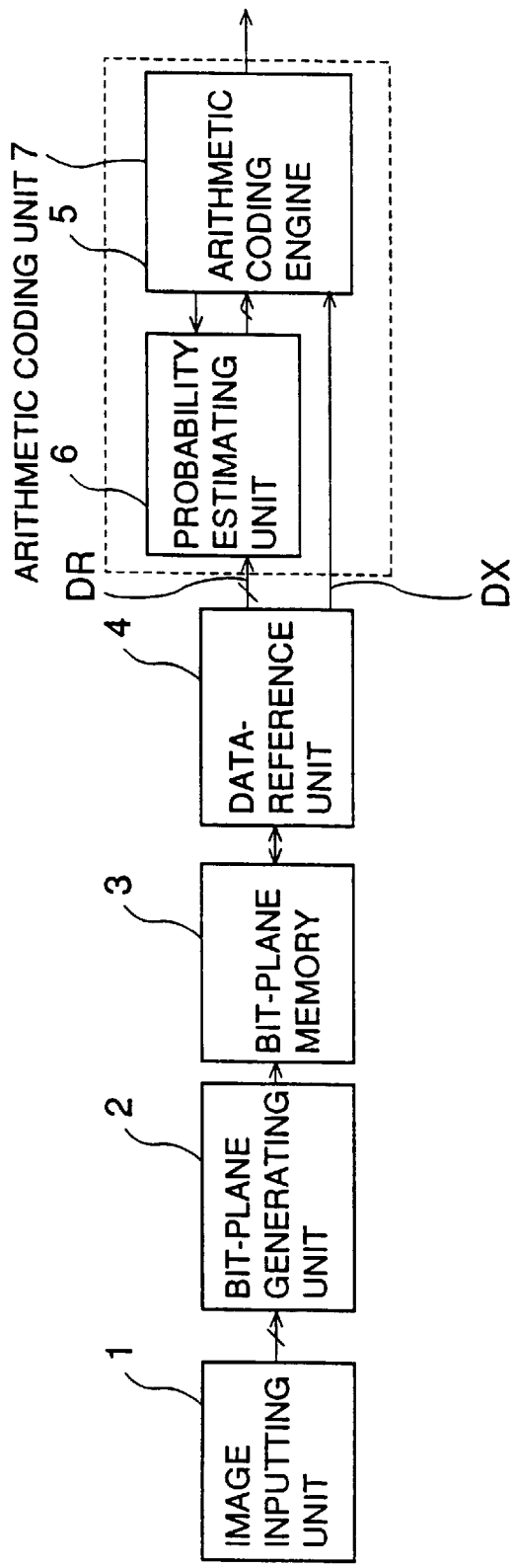
FIG. 4 is a block diagram of a coding device which encodes and compresses multi-level-image data by using a JBIG method.
Figure 6:
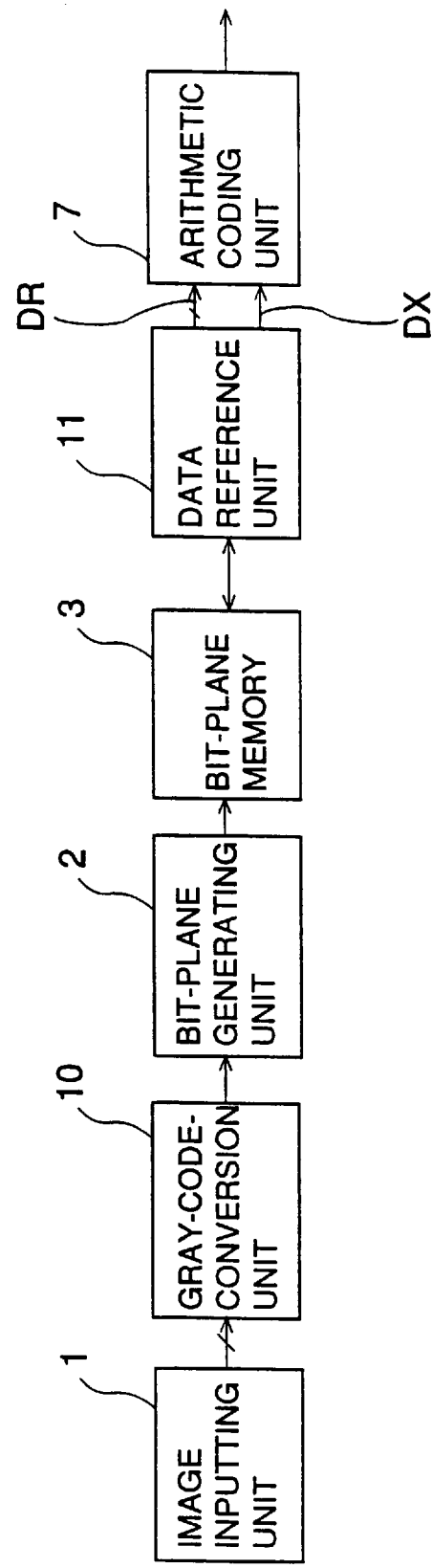
FIG. 6 is a block diagram of a bit-plane coding device according to a first embodiment of the present invention.

FIG. 6 is a block diagram of a bit-plane coding device according to a first embodiment of the present invention. In FIG. 6, the same elements as those of FIG. 4 are referred to by the same numerals.

In FIG. 6, the bit-plane-coding device includes the image inputting unit 1, the bit-plane generating unit 2, the bit-plane memory 3, the arithmetic coding unit 7, a gray-code-conversion unit 10, and a data reference unit 11.

The image inputting unit 1 receives multi-level-image data comprised of eight bits per pixel, for example, and supplies the multi-level-image data to the gray-code-conversion unit 10. The gray-code-conversion unit 10 converts the multi-level-image data into gray codes comprising 8 bits. The obtained gray codes are then applied to the bit-plane generating unit 2.

The bit-plane generating unit 2 expands the multi-level-image data converted into the gray codes to generate bit planes, and data of each bit plane is stored in the bit-plane memory 3.

The data-reference unit 11 reads data of the current pixel to be coded from the bit-plane memory 3, and supplies the data as current-pixel data DX to the arithmetic coding engine 5 (see FIG. 4). Also, the data-reference unit 11 reads data of a plurality of reference pixels from the bit-plane memory 3 by applying a template to the current pixel, and supplies the data as reference-pixel data DR to the probability estimating unit 6 (see FIG. 4). The template used here will be described later in detail.

The probability estimating unit 6 determines the context of the current pixel based on the reference-pixel data DR. Then, the probability estimating unit 6 obtains an estimated probability of the superior symbol or the inferior symbol, and generates a symbol type indicating the superior symbol or the inferior symbol as being the symbol of the estimated probability. These results are supplied to the arithmetic coding engine 5.

The arithmetic coding engine 5 carries out the arithmetic coding process described above based on the current-pixel data DX, the estimated probability, and the symbol type. Coded data obtained from the arithmetic coding process is output from the arithmetic coding engine 5. If the renormalization process is conducted during the coding process, the arithmetic coding engine 5 informs the probability estimating unit 6 of this fact. The probability estimating unit 6 operating in synchronism with the renormalization process makes a transition of the context to update the state used for the probability estimation. Also, the probability estimating unit 6 stores 8-bit data including a value of the Markov state for each context (i.e., value of the probability estimation index comprising 7 bits) and 1 bit for indicating the superior symbol as being either black or white.

A coding order in which pixels of the image data are coded includes a bit-plane-by-bit-plane coding order, a line-by-line coding order, and a bit-by-bit coding order. The bit-plane-by-bit-plane coding order encodes pixels successively taken from the image data for each bit plane. The line-by-line coding order encodes pixels successively taken from the image data for each line across the bit planes. The bit-by-bit coding order encodes pixels successively taken from the image data for each pixel across the bit planes.

Figure 7:
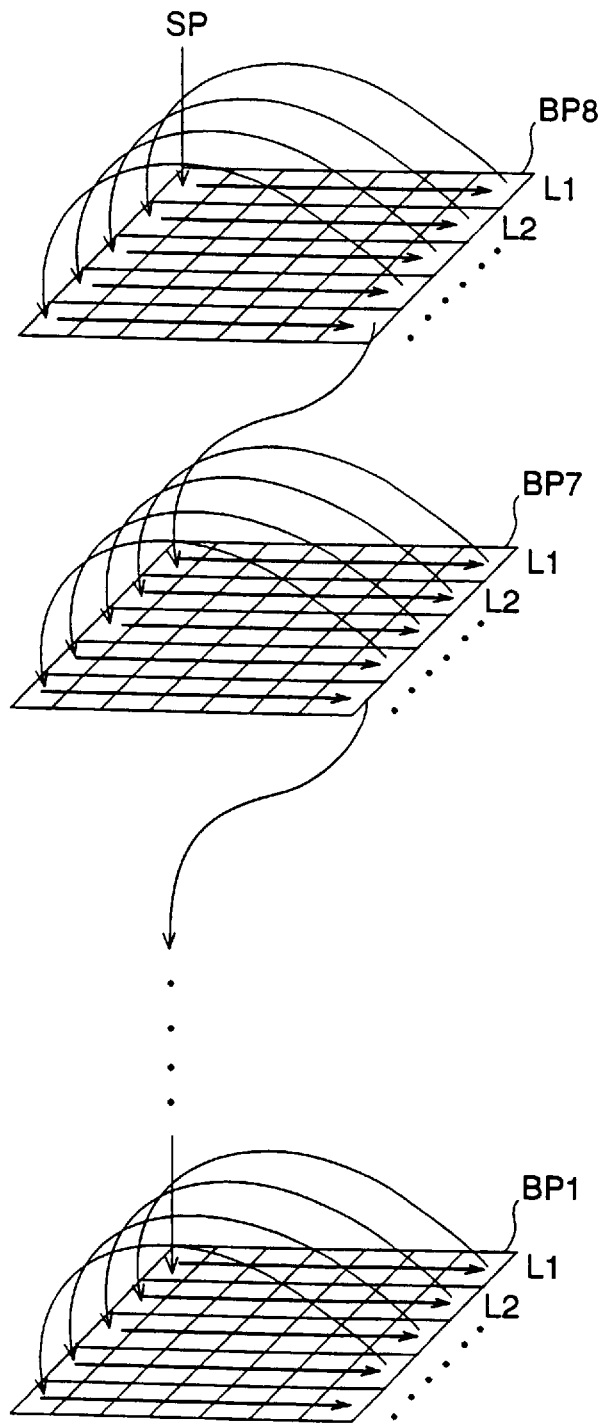
FIG. 7 is an illustrative drawing showing a bit-plane-by-bit-plane coding order.

FIG. 7 is an illustrative drawing showing the bit-plane-by-bit-plane coding order.

As shown in FIG. 7, the first pixel of the first line of the bit plane BP8 corresponding to the most significant bit MSB is a start pixel SP where the coding begins. The current pixel is successively selected by starting from the start pixel SP in a main scanning direction to finish the coding process of the first line. Then, the coding of the second line is carried out in the main scanning direction by starting from the first pixel of the second line. After finishing the coding of each line of the bit plane BP8, the first pixel of the first line of the bit plane BP7 is selected as the current pixel. In the same manner, the coding of each line of the bit plane BP7 is carried out.

Then, the coding of the bit planes BP6, BP5, BP4, BP3, BP2, and BP1 is carried out successively, and the coding process ends at the last bit of the last line of the bit plane BP1.

Figure 8:
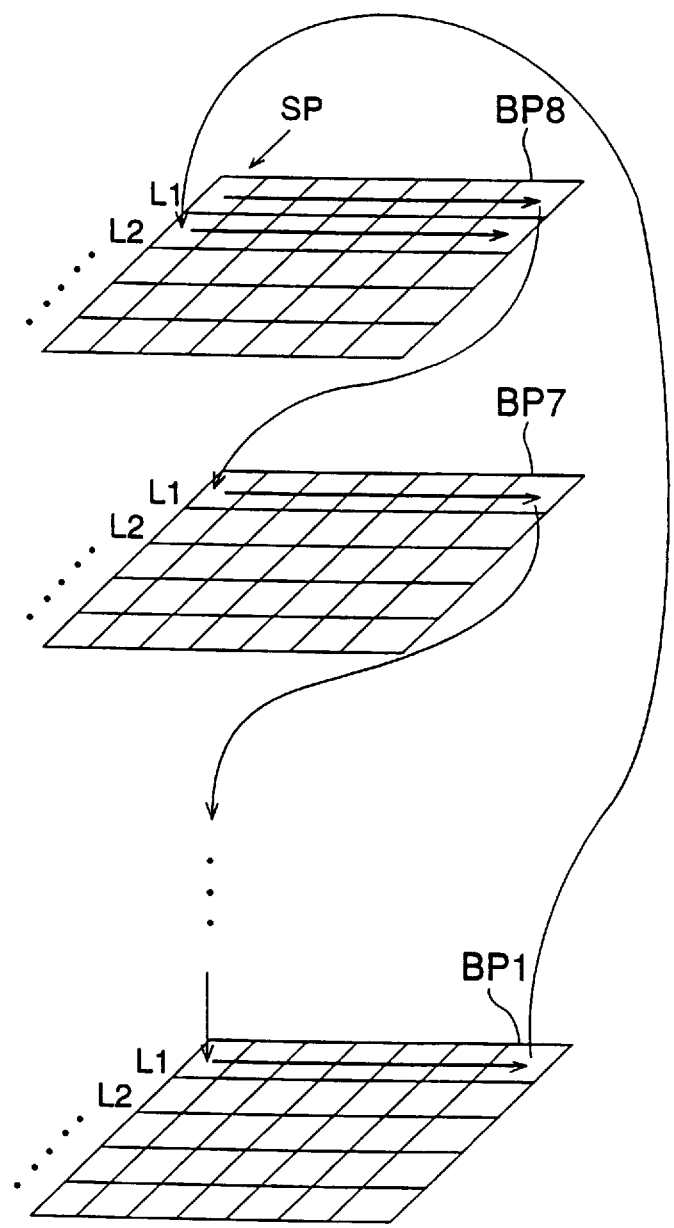
FIG. 8 is an illustrative drawing showing a line-by-line coding order.

FIG. 8 is an illustrative drawing showing the line-by-line coding order.

As shown in FIG. 8, the first pixel of the first line of the bit plane BP8 corresponding to the most significant bit MSB is a start pixel SP where the coding begins. The current pixel is successively selected by starting from the start pixel SP in the main scanning direction to finish the coding process of the first line. Then, the first pixel of the first line of the bit plane BP7 is selected as the current pixel, and the coding of this line is carried out in the main scanning direction. Then, the first lines of the bit planes BP6, BP5, BP4, BP3, BP2, and BP1 are successively coded in this order in the same manner. After finishing the coding of all the first lines, the first pixel of the second line of the bit plane BP8 is selected as the current pixel.

Then, the coding of the second lines of the bit planes BP8, BP7, BP6, BP5, BP4, BP3, BP2, and BP1 is successively carried out in this order. After finishing the coding of all the second lines, the third line of the bit plane BP8 is subjected to the coding.

In the same manner, the coding of the third line through the last line is carried out.

Figure 9:
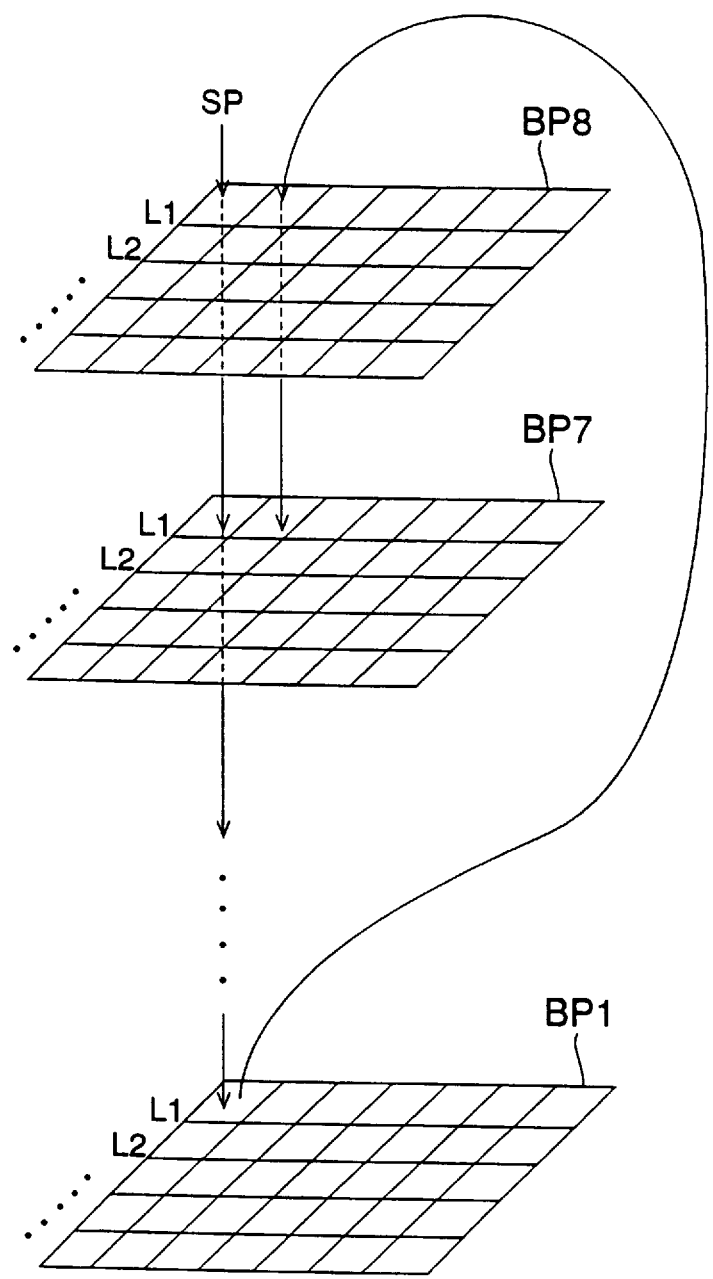
FIG. 9 is an illustrative drawing showing a pixel-by-pixel coding order.

FIG. 9 is an illustrative drawing showing the pixel-by-pixel coding order.

As shown in FIG. 9, the first pixel of the first line of the bit plane BP8 corresponding to the most significant bit MSB is a start pixel SP where the coding begins. starting from the start pixel SP, the first pixel of the first line is successively selected as the current pixel from the bit planes BP8, BP7, BP6, BP5, BP4, BP3, BP2, and BP1 in this order.

Then, the second pixel of the first line of the bit plane BP8 is selected as the current pixel, and the second pixels of the first lines are successively coded for the bit planes BP7, BP6, BP5, BP4, BP3, BP2, and BP1 in this order.

In the same manner, the third pixel through the last pixel of the first line, the first pixel through the last pixel of the second line, and so on are subjected to the coding process.

In the following, the template used by the data reference unit 11 will be described. Basically, the reference pixels for the current pixel are selected from pixels for which the coding is already finished. Thus, a selection of the reference pixels is different depending on the coding order to be used.

Figure 10:
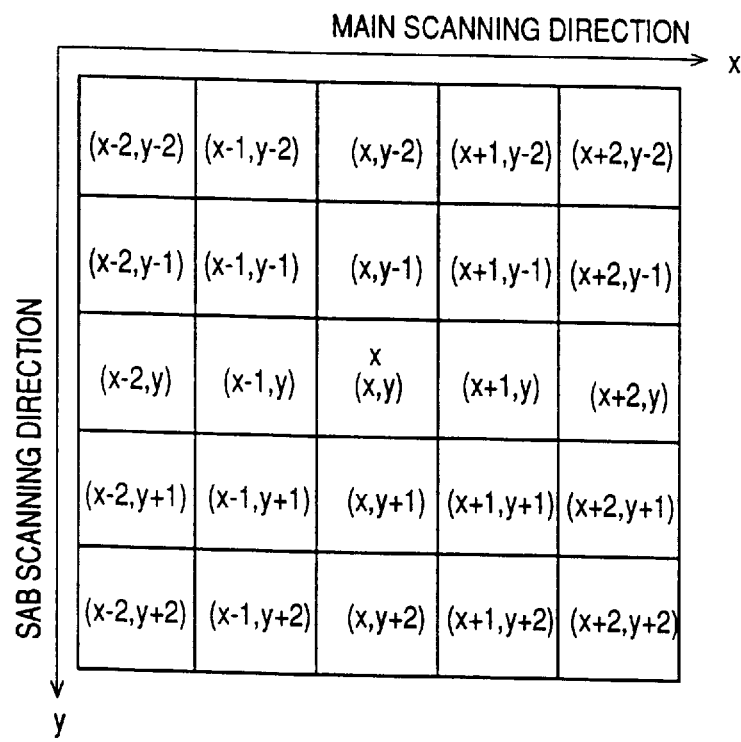
FIG. 10 is an illustrative drawing for showing coordinates of pixels surrounding a current pixel.

FIG. 10 is an illustrative drawing for showing coordinates of pixels surrounding the current pixel.

As shown in FIG. 10, a coordinate of a current pixel X is given as (x, y), where an axis x is in a main scanning direction and an axis y is in a sub-scanning direction. In a 5-by-5 pixel matrix having the current pixel X at a center thereof, a pixel at the top left corner has a coordinate of (x−2, y−2), and a pixel at the bottom right corner has a coordinate of (x+2, y+2).

Figure 11:
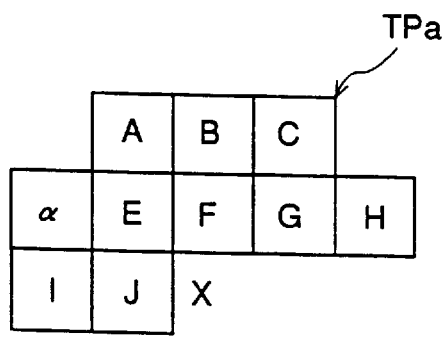
FIG. 11 is an illustrative drawing showing a template used by a data reference unit 11 of FIG. 6.

FIG. 11 is an illustrative drawing showing a template TPa used by the data reference unit 11.

The template TPa includes fixed reference pixels A, B, C, E, F, G, H, I, and J and a floating reference pixel α. The fixed reference pixels are selected from the same bit plane as that of the current pixel X. The floating reference pixel is selected from the same bit plane as that of the current pixel X or from other bit planes.

Coordinates of the fixed reference pixels A, B, C, E, F, G, H, I, and J are (x−1, y−2), (x, y−2), (x+1, y−2), (x−1, y−1), (x, y−1), (x+1, y−1), (x+2, y−1), (x−2, y), and (x−1, y), respectively.

The coordinate of the floating reference pixel α is determined as follows when the bit-plane-by-bit-plane coding order is employed. The determination of the coordinate of the floating reference pixel α is made experimentally rather than theoretically. That is, the floating reference pixel α is selected so that entropy of the image is lowest through such selection of the floating reference pixel under the condition that all the fixed reference pixels are already selected. An optimal coordinate of the floating reference pixel is determined in this manner for each of a set of typical images to statistically determine the coordinate of the floating reference pixel which should be optimal on average.

FIGS. 12A through 12H are illustrative drawings showing the coordinate of the floating reference pixel α when the bit-plane-by-bit-plane coding order is employed.

Figure 12G:
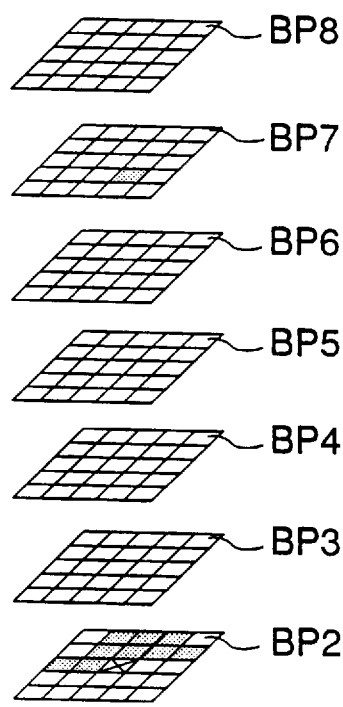
Figure 12H:
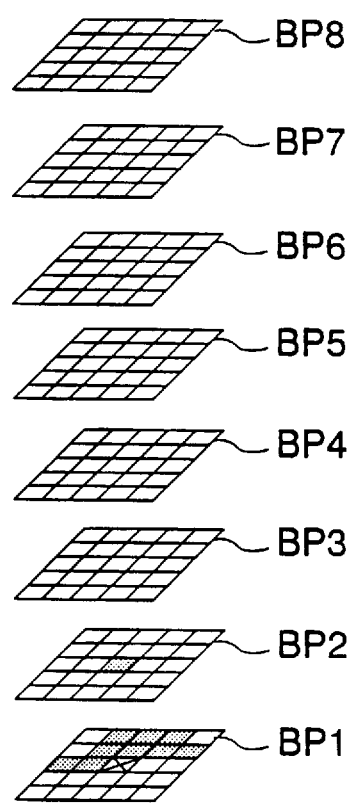

As shown in FIG. 12A, when the current pixel X belongs to the bit plane BP8, a pixel at a coordinate (x−2, y−1) of the bit plane BP8 is used as the floating reference pixel α. As shown in FIG. 12B, when the current pixel X belongs to the bit plane BP7, a pixel at a coordinate (x+1, y) of the bit plane BP8 is used as the floating reference pixel α. As shown in FIG. 12C, when the current pixel X belongs to the bit plane BP6, a pixel at a coordinate (x, y+1) of the bit plane BP7 is used as the floating reference pixel α. As shown in FIG. 12D, when the current pixel X belongs to the bit plane BP5, a pixel at a coordinate (x, y+1) of the bit plane BP7 is used as the floating reference pixel α. As shown in FIG. 12E, when the current pixel X belongs to the bit plane BP4, a pixel at a coordinate (x+1, y+1) of the bit plane BP7 is used as the floating reference pixel α. As shown in FIG. 12F, when the current pixel X belongs to the bit plane BP3, a pixel at a coordinate (x+1, y+1) of the bit plane BP7 is used as the floating reference pixel α. As shown in FIG. 12G, when the current pixel X belongs to the bit plane BP2, a pixel at a coordinate (x+1, y+1) of the bit plane BP7 is used as the floating reference pixel α. As shown in FIG. 12H, when the current pixel X belongs to the bit plane BP1, a pixel at a coordinate (x, y) of the bit plane BP2 is used as the floating reference pixel α.

Further, when the line-by-line coding order is employed, the coordinate of the floating reference pixel α is determined as follows. The determination of the coordinate of the floating reference pixel α is made experimentally rather than theoretically. That is, the floating reference pixel α is selected so that entropy of the image is lowest through such selection of the floating reference pixel under the condition that all the fixed reference pixels are already selected. An optimal coordinate of the floating reference pixel is determined in this manner for each of a set of typical images to statistically determine the coordinate of the floating reference pixel which should be optimal on average.

FIGS. 13A through 13H are illustrative drawings showing the coordinate of the floating reference pixel α when the line-by-line coding order is employed.

As shown in FIG. 13A, when the current pixel X belongs to the bit plane BP8, a pixel at a coordinate (x−2, y−1) of the bit plane BP8 is used as the floating reference pixel α. As shown in FIG. 13B, when the current pixel X belongs to the bit plane BP7, a pixel at a coordinate (x+1, y) of the bit plane BP8 is used as the floating reference pixel α. As shown in FIG. 13C, when the current pixel X belongs to the bit plane BP6, a pixel at a coordinate (x+1, y) of the bit plane BP7 is used as the floating reference pixel α. As shown in FIG. 13D, when the current pixel X belongs to the bit plane BP5, a pixel at a coordinate (x+1, y) of the bit plane BP7 is used as the floating reference pixel α. As shown in FIG. 13E, when the current pixel X belongs to the bit plane BP4, a pixel at a coordinate (x+1, y) of the bit plane BP7 is used as the floating reference pixel α. As shown in FIG. 13F, when the current pixel X belongs to the bit plane BP3, a pixel at a coordinate (x, y) of the bit plane BP5 is used as the floating reference pixel α. As shown in FIG. 13G, when the current pixel X belongs to the bit plane BP2, a pixel at a coordinate (x, y) of the bit plane BP3 is used as the floating reference pixel α. As shown in FIG. 13H, when the current pixel X belongs to the bit plane BP1, a pixel at a coordinate (x, y) of the bit plane BP2 is used as the floating reference pixel α.

Further, when the pixel-by-pixel coding order is employed, the coordinate of the floating reference pixel α is determined as follows. The determination of the coordinate of the floating reference pixel α is made experimentally rather than theoretically. That is, the floating reference pixel α is selected so that entropy of the image is lowest through such selection of the floating reference pixel under the condition that all the fixed reference pixels are already selected. An optimal coordinate of the floating reference pixel is determined in this manner for each of a set of typical images to statistically determine the coordinate of the floating reference pixel which should be optimal on average.

FIGS. 14A through 14H are illustrative drawings showing the coordinate of the floating reference pixel α when the pixel-by-pixel coding order is employed.

As shown in FIG. 14A, when the current pixel X belongs to the bit plane BP8, a pixel at a coordinate (x−2, y−1) of the bit plane BP8 is used as the floating reference pixel α. As shown in FIG. 14B, when the current pixel X belongs to the bit plane BP7, a pixel at a coordinate (x, y) of the bit plane BP8 is used as the floating reference pixel α. As shown in FIG. 14C, when the current pixel X belongs to the bit plane BP6, a pixel at a coordinate (x−1, y) of the bit plane BP7 is used as the floating reference pixel α. As shown in FIG. 14D, when the current pixel X belongs to the bit plane BP5, a pixel at a coordinate (x−1, y) of the bit plane BP7 is used as the floating reference pixel α. As shown in FIG. 14E, when the current pixel X belongs to the bit plane BP4, a pixel at a coordinate (x−1, y) of the bit plane BP7 is used as the floating reference pixel α. As shown in FIG. 14F, when the current pixel X belongs to the bit plane BP3, a pixel at a coordinate (x, y) of the bit plane BP7 is used as the floating reference pixel α. As shown in FIG. 14G, when the current pixel X belongs to the bit plane BP2, a pixel at a coordinate (x, y) of the bit plane BP3 is used as the floating reference pixel α. As shown in FIG. 14H, when the current pixel X belongs to the bit plane BP1, a pixel at a coordinate (x, y) of the bit plane BP2 is used as the floating reference pixel α.

As described above, according to the first embodiment of the present invention, an optimal shape of the template TPa is determined in accordance with the coding order to be employed, so that the compression rate of the coding is optimized for each of the coding order.

Also, according to the first embodiment of the present invention, the data transfer required for extracting the data of the floating reference pixel is conducted only once. Thus, a slow down of the coding processing speed is sustained at a minimum.

FIGS. 15A through 15H are illustrative drawings showing the coordinate of the floating reference pixel α according to an alternate example of the first embodiment when the bit-plane-by-bit-plane coding order is employed.

Figure 15A:
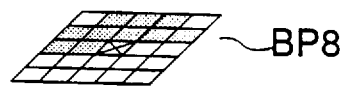
FIGS. 15A through 15H are illustrative drawings showing a coordinate of the floating reference pixel according to an alternate example of the first embodiment when the bit-plane-by-bit-plane coding order is employed.
Figure 15E:
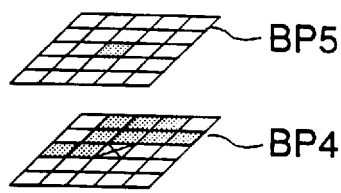
Figure 15B:
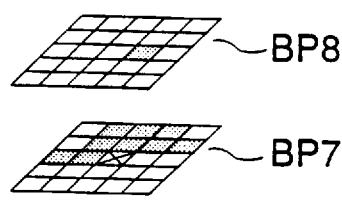
Figure 15F:
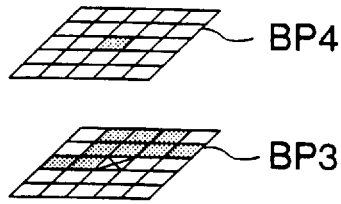
Figure 15C:
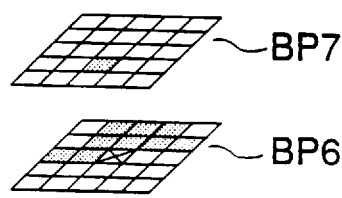
Figure 15G:
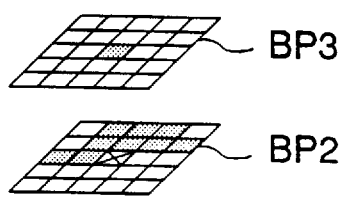
Figure 15D:
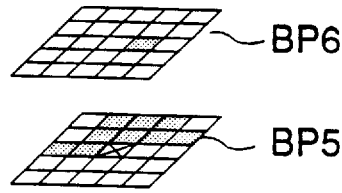
Figure 15H:
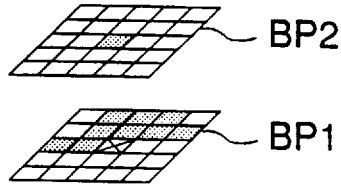

As shown in FIG. 15A, when the current pixel X belongs to the bit plane BP8, a pixel at a coordinate (x−2, y−1) of the bit plane BP8 is used as the floating reference pixel α. As shown in FIG. 15B, when the current pixel X belongs to the bit plane BP7, a pixel at a coordinate (x+1, y) of the bit plane BP8 is used as the floating reference pixel α. As shown in FIG. 15C, when the current pixel X belongs to the bit plane BP6, a pixel at a coordinate (x, y+1) of the bit plane BP7 is used as the floating reference pixel α. As shown in FIG. 15D, when the current pixel X belongs to the bit plane BP5, a pixel at a coordinate (x+1, y) of the bit plane BP6 is used as the floating reference pixel α. As shown in FIG. 15E, when the current pixel X belongs to the bit plane BP4, a pixel at a coordinate (x, y) of the bit plane BP5 is used as the floating reference pixel α. As shown in FIG. 15F, when the current pixel X belongs to the bit plane BP3, a pixel at a coordinate (x, y) of the bit plane BP4 is used as the floating reference pixel α. As shown in FIG. 15G, when the current pixel X belongs to the bit plane BP2, a pixel at a coordinate (x, y) of the bit plane BP3 is used as the floating reference pixel α. As shown in FIG. 15H, when the current pixel X belongs to the bit plane BP1, a pixel at a coordinate (x, y) of the bit plane BP2 is used as the floating reference pixel α.

Further, when the line-by-line coding order is employed, the coordinate of the floating reference pixel α is determined as follows. The determination of the coordinate of the floating reference pixel α is made experimentally rather than theoretically. That is, the floating reference pixel α is selected so that entropy of the image is lowest through such selection of the floating reference pixel under the condition that all the fixed reference pixels are already selected. An optimal coordinate of the floating reference pixel is determined in this manner for each of a set of typical images to statistically determine the coordinate of the floating reference pixel which should be optimal on average.

FIGS. 16A through 16H are illustrative drawings showing the coordinate of the floating reference pixel α according to an alternate example of the first embodiment when the line-by-line coding order is employed.

As shown in FIG. 16A, when the current pixel X belongs to the bit plane BP8, a pixel at a coordinate (x−2, y−1) of the bit plane BP8 is used as the floating reference pixel α. As shown in FIG. 16B, when the current pixel X belongs to the bit plane BP7, a pixel at a coordinate (x+1, y) of the bit plane BP8 is used as the floating reference pixel α. As shown in FIG. 16C, when the current pixel X belongs to the bit plane BP6, a pixel at a coordinate (x+1, y) of the bit plane BP7 is used as the floating reference pixel α. As shown in FIG. 16D, when the current pixel X belongs to the bit plane BP5, a pixel at a coordinate (x+1, y) of the bit plane BP6 is used as the floating reference pixel α. As shown in FIG. 16E, when the current pixel X belongs to the bit plane BP4, a pixel at a coordinate (x, y) of the bit plane BP5 is used as the floating reference pixel α. As shown in FIG. 16F, when the current pixel X belongs to the bit plane BP3, a pixel at a coordinate (x, y) of the bit plane BP4 is used as the floating reference pixel α. As shown in FIG. 16G, when the current pixel X belongs to the bit plane BP2, a pixel at a coordinate (x, y) of the bit plane BP3 is used as the floating reference pixel α. As shown in FIG. 16H, when the current pixel X belongs to the bit plane BP1, a pixel at a coordinate (x, y) of the bit plane BP2 is used as the floating reference pixel α.

Further, when the pixel-by-pixel coding order is employed, the coordinate of the floating reference pixel α is determined as follows. The determination of the coordinate of the floating reference pixel α is made experimentally rather than theoretically. That is, the floating reference pixel α is selected so that entropy of the image is lowest through such selection of the floating reference pixel under the condition that all the fixed reference pixels are already selected. An optimal coordinate of the floating reference pixel is determined in this manner for each of a set of typical images to statistically determine the coordinate of the floating reference pixel which should be optimal on average.

FIGS. 17A through 17H are illustrative drawings showing the coordinate of the floating reference pixel α according to an alternate example of the first embodiment when the pixel-by-pixel coding order is employed.

As shown in FIG. 17A, when the current pixel X belongs to the bit plane BP8, a pixel at a coordinate (x−2, y−1) of the bit plane BP8 is used as the floating reference pixel α. As shown in FIG. 17B, when the current pixel X belongs to the bit plane BP7, a pixel at a coordinate (x, y) of the bit plane BP8 is used as the floating reference pixel α. As shown in FIG. 17C, when the current pixel X belongs to the bit plane BP6, a pixel at a coordinate (x–1, y) of the bit plane BP7 is used as the floating reference pixel α. As shown in FIG. 17D, when the current pixel X belongs to the bit plane BP5, a pixel at a coordinate (x, y) of the bit plane BP6 is used as the floating reference pixel α. As shown in FIG. 17E, when the current pixel X belongs to the bit plane BP4, a pixel at a coordinate (x, y) of the bit plane BP5 is used as the floating reference pixel α. As shown in FIG. 17F, when the current pixel X belongs to the bit plane BP3, a pixel at a coordinate (x, y) of the bit plane BP4 is used as the floating reference pixel α. As shown in FIG. 17G, when the current pixel X belongs to the bit plane BP2, a pixel at a coordinate (x, y) of the bit plane BP3 is used as the floating reference pixel α. As shown in FIG. 17H, when the current pixel X belongs to the bit plane BP1, a pixel at a coordinate (x, y) of the bit plane BP2 is used as the floating reference pixel α.

According to experiments conducted by the inventor, improvements in code lengths are observed in the variations of the first embodiment described above.

Figure 5:
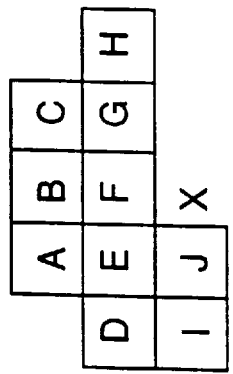
FIG. 5 is an illustrative drawing showing an example of a template used by a data-reference unit of FIG. 4.
Figure 18:
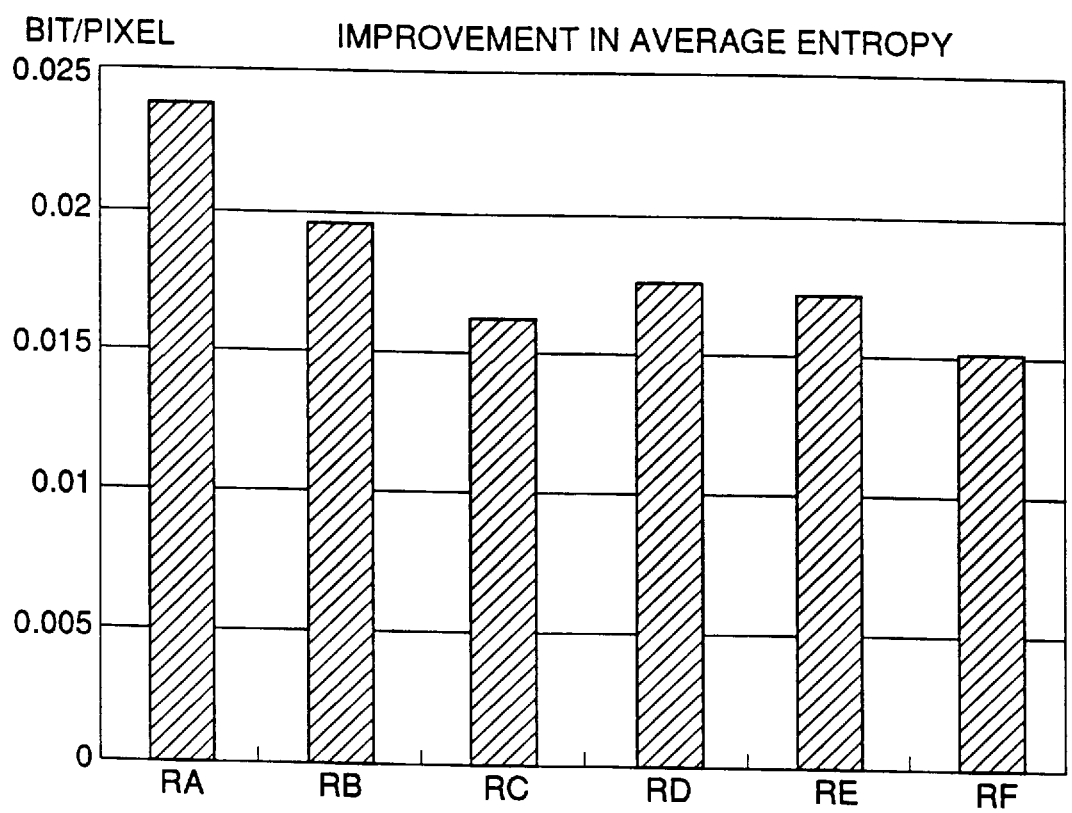
FIG. 18 is a chart showing an improvement in the average entropy for a set of images obtained by using each of the variations of the first embodiment over a corresponding average entropy obtained by use of a JBIG-default-three-line template of FIG. 11.

FIG. 18 is a chart showing an improvement in an average entropy for a set of images obtained by using each of the variations of the first embodiment over a corresponding average entropy obtained by use of the JBIG-default-three-line template of FIG. 5. In FIG. 18, an improvement in the average entropy per pixel over the JBIG-default-three-line template is shown by each of bars RA, RB, RC, RD, RE, and RF. Here, the bars RA, RB, RC, RD, RE, and RF correspond to FIGS. 12A through 12H, FIGS. 13A through 13H, FIGS. 14A through 14H, FIGS. 15A through 15H, FIGS. 16A through 16H, and FIGS. 17A through 17H.

In FIG. 18, the bar RF, for example, shows that the average entropy per pixel is improved (reduced) by about 0.015 bit when the templates of FIGS. 17A through 17H are used. As can be seen in FIG. 18, all the bars show some improvements in the average entropy per pixel over the use of the JBIG-default-three-line template.

In the first embodiment described above, the number of the reference pixels extracted by the template TPa is ten. It is obvious, however, that the number of reference pixels is not limited to ten. In the following, templates extracting twelve reference pixels according to a second embodiment of the present invention will be described. In this case, the number of contexts is equal to 4096, so that the probability estimating unit 6 of the arithmetic coding unit 7 needs to have a memory for storing this number of contexts.

Figures 19, 20:
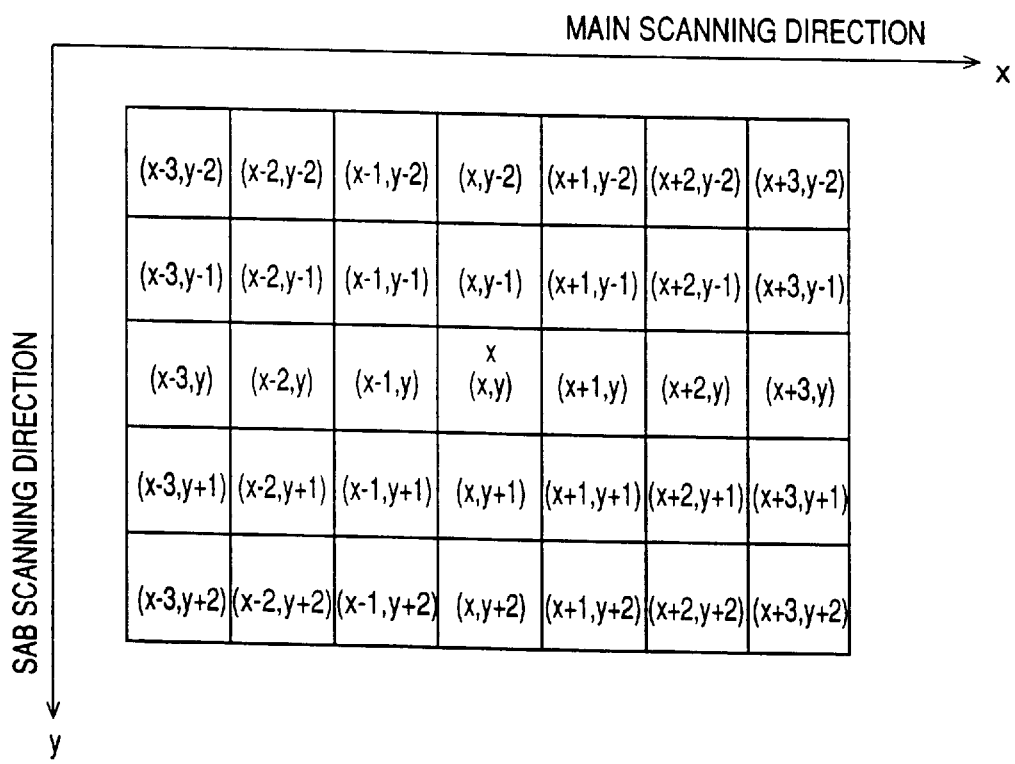
FIG. 19 is an illustrative drawing for showing coordinates of twelve pixels surrounding a current pixel.
FIG. 20 is an illustrative drawing showing a template for extracting twelve neighboring pixels of the current pixel according to a second embodiment of the present invention.

FIG. 19 is an illustrative drawing for showing coordinates of twelve pixels surrounding the current pixel.

As shown in FIG. 19, a coordinate of the current pixel X is given as (x, y), where an axis x is in a main scanning direction and an axis y is in a sub-scanning direction. In a 7-by-5 pixel matrix having the current pixel X at a center thereof, a pixel at the top left corner has a coordinate of (x–3, y–2), and a pixel at the bottom right corner has a coordinate of (x+3, y+2).

FIG. 20 is an illustrative drawing showing a template for extracting twelve neighboring pixels of the current pixel according to the second embodiment of the present invention.

This template includes fixed reference pixels A', B', C', D', E', F', G', H', I', J', and K' and a floating reference pixel β, totaling twelve pixels. The fixed reference pixels are selected from the same bit plane as that of the current pixel X. The floating reference pixel is selected from the same bit plane as that of the current pixel X or from other bit planes.

Coordinates of the fixed reference pixels A', B', C', D', E', F', G', H', I', J', and K' are (x–1, y–2), (x, y–2), (x+1, y–2), (x–2, y–1), (x–1, y–1), (x, y–1), (x+1, y–1), (x+2, y–1), (x–3, y), (x–2, y), and (x–1, y), respectively.

The coordinate of the floating reference pixel β is determined as follows when the bit-plane-by-bit-plane coding order is employed. The determination of the coordinate of the floating reference pixel β is made experimentally rather than theoretically. That is, the floating reference pixel β is selected so that entropy of the image is lowest through such selection of the floating reference pixel under the condition that all the fixed reference pixels are already selected. An optimal coordinate of the floating reference pixel is determined in this manner for each of a set of typical images to statistically determine the coordinate of the floating reference pixel which should be optimal on average.

FIGS. 21A through 21H are illustrative drawings showing the coordinate of the floating reference pixel β according to the second embodiment when the bit-plane-by-bit-plane coding order is employed.

Figure 21G:
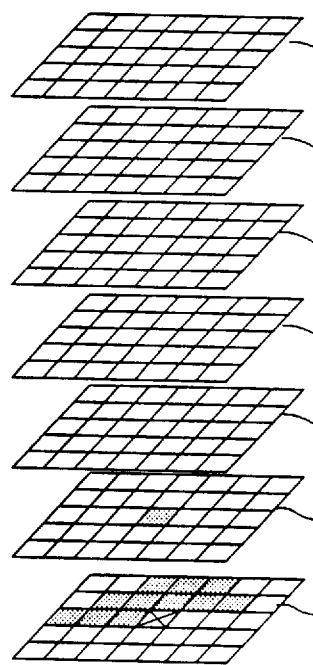
Figure 21H:
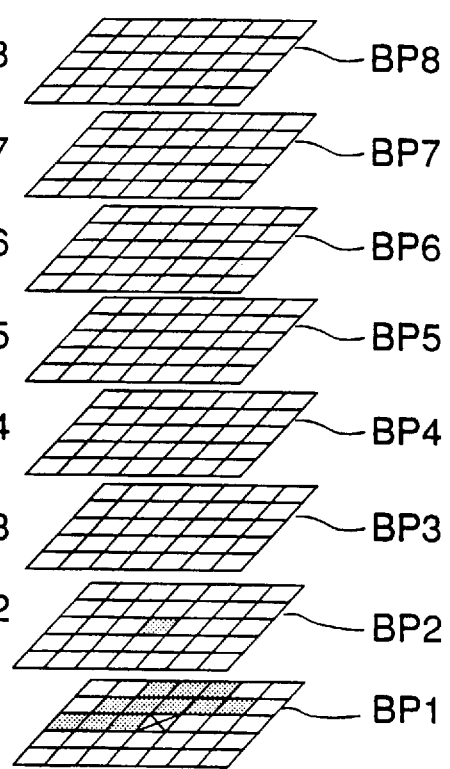

As shown in FIG. 21A, when the current pixel X belongs to the bit plane BP8, a pixel at a coordinate (x+2, y–2) of the bit plane BP8 is used as the floating reference pixel β. As shown in FIG. 21B, when the current pixel X belongs to the bit plane BP7, a pixel at a coordinate (x+1, y) of the bit plane BP8 is used as the floating reference pixel β. As shown in FIG. 21C, when the current pixel x belongs to the bit plane BP6, a pixel at a coordinate (x, y+1) of the bit plane BP7 is used as the floating reference pixel β. As shown in FIG. 21D, when the current pixel X belongs to the bit plane BP5, a pixel at a coordinate (x, y+1) of the bit plane BP7 is used as the floating reference pixel β. As shown in FIG. 21E, when the current pixel X belongs to the bit plane BP4, a pixel at a coordinate (x+1, y+1) of the bit plane BP7 is used as the floating reference pixel β. As shown in FIG. 21F, when the current pixel X belongs to the bit plane BP3, a pixel at a coordinate (x+1, y+1) of the bit plane BP7 is used as the floating reference pixel β. As shown in FIG. 21G, when the current pixel X belongs to the bit plane BP2, a pixel at a coordinate (x, y) of the bit plane BP3 is used as the floating reference pixel β. As shown in FIG. 21H, when the current pixel X belongs to the bit plane BP1, a pixel at a coordinate (x, y) of the bit plane BP2 is used as the floating reference pixel β.

Further, when the line-by-line coding order is employed, the coordinate of the floating reference pixel β is determined as follows. The determination of the coordinate of the floating reference pixel β is made experimentally rather than theoretically. That is, the floating reference pixel β is selected so that entropy of the image is lowest through such selection of the floating reference pixel under the condition that all the fixed reference pixels are already selected. An optimal coordinate of the floating reference pixel is determined in this manner for each of a set of typical images to statistically determine the coordinate of the floating reference pixel which should be optimal on average.

FIGS. 22A through 22H are illustrative drawings showing the coordinate of the floating reference pixel β according to the second embodiment when the line-by-line coding order is employed.

Figure 22G:
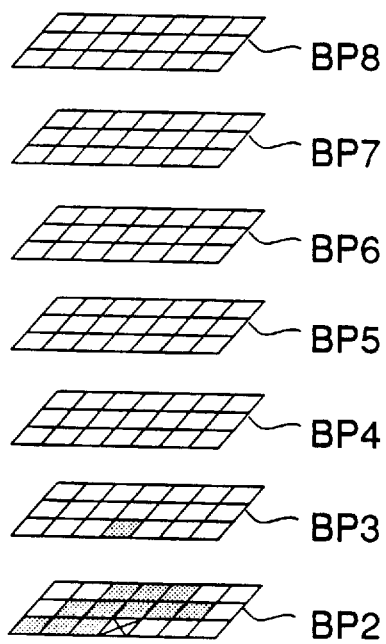
Figure 22H:
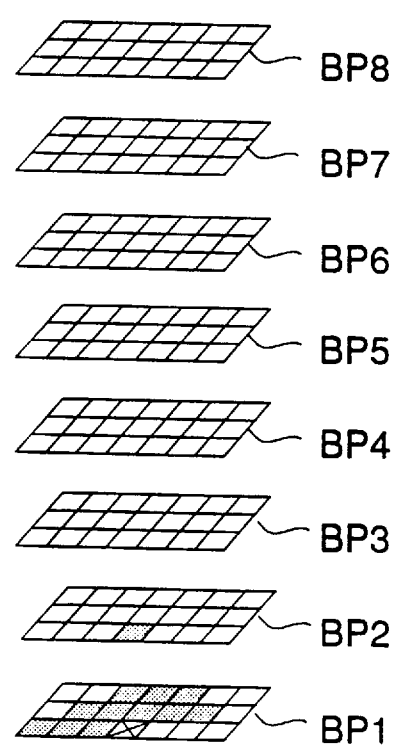

As shown in FIG. 22A, when the current pixel X belongs to the bit plane BP8, a pixel at a coordinate (x+2, y–2) of the bit plane BP8 is used as the floating reference pixel β. As shown in FIG. 22B, when the current pixel X belongs to the bit plane BP7, a pixel at a coordinate (x+1, y) of the bit plane BP8 is used as the floating reference pixel β. As shown in FIG. 22C, when the current pixel X belongs to the bit plane BP6, a pixel at a coordinate (x+1, y) of the bit plane BP7 is used as the floating reference pixel β. As shown in FIG. 22D, when the current pixel X belongs to the bit plane BP5, a pixel at a coordinate (x+1, y) of the bit plane BP7 is used as the floating reference pixel β. As shown in FIG. 22E, when the current pixel X belongs to the bit plane BP4, a pixel at a coordinate (x+1, y) of the bit plane BP7 is used as the floating reference pixel β. As shown in FIG. 22F, when the current pixel X belongs to the bit plane BP3, a pixel at a coordinate (x+1, y) of the bit plane BP7 is used as the floating reference pixel β. As shown in FIG. 22G, when the current pixel X belongs to the bit plane BP2, a pixel at a coordinate (x, y) of the bit plane BP3 is used as the floating reference pixel β. As shown in FIG. 22H, when the current pixel X belongs to the bit plane BP1, a pixel at a coordinate (x, y) of the bit plane BP2 is used as the floating reference pixel β.

Further, when the pixel-by-pixel coding order is employed, the coordinate of the floating reference pixel β is determined as follows. The determination of the coordinate of the floating reference pixel β is made experimentally rather than theoretically. That is, the floating reference pixel β is selected so that entropy of the image is lowest through such selection of the floating reference pixel under the condition that all the fixed reference pixels are already selected. An optimal coordinate of the floating reference pixel is determined in this manner for each of a set of typical images to statistically determine the coordinate of the floating reference pixel which should be optimal on average.

FIGS. 23A through 23H are illustrative drawings showing the coordinate of the floating reference pixel β according to the second embodiment when the pixel-by-pixel coding order is employed.

Figure 23G:
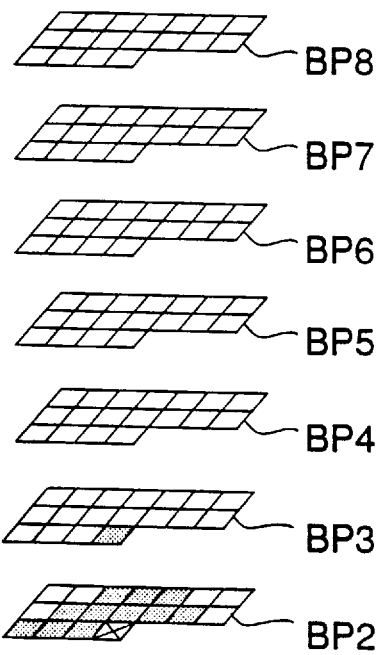
Figure 23H:
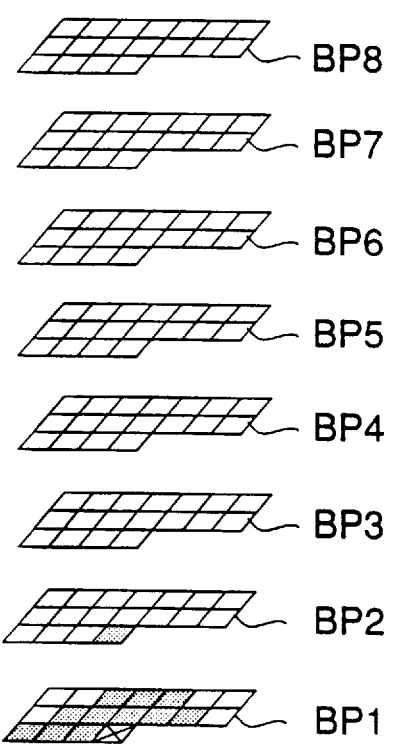

As shown in FIG. 23A, when the current pixel X belongs to the bit plane BP8, a pixel at a coordinate (x+2, y−2) of the bit plane BP8 is used as the floating reference pixel β. As shown in FIG. 23B, when the current pixel X belongs to the bit plane BP7, a pixel at a coordinate (x, y) of the bit plane BP8 is used as the floating reference pixel β. As shown in FIG. 23C, when the current pixel X belongs to the bit plane BP6, a pixel at a coordinate (x, y) of the bit plane BP7 is used as the floating reference pixel β. As shown in FIG. 23D, when the current pixel X belongs to the bit plane BP5, a pixel at a coordinate (x−1, y) of the bit plane BP7 is used as the floating reference pixel β. As shown in FIG. 23E, when the current pixel X belongs to the bit plane BP4, a pixel at a coordinate (x, y) of the bit plane BP5 is used as the floating reference pixel β. As shown in FIG. 23F, when the current pixel X belongs to the bit plane BP3, a pixel at a coordinate (x, y) of the bit plane BP5 is used as the floating reference pixel β. As shown in FIG. 23G, when the current pixel X belongs to the bit plane BP2, a pixel at a coordinate (x, y) of the bit plane BP3 is used as the floating reference pixel β. As shown in FIG. 23H, when the current pixel X belongs to the bit plane BP1, a pixel at a coordinate (x, y) of the bit plane BP2 is used as the floating reference pixel β.

As described above, according to the second embodiment of the present invention, an optimal shape of the template is determined in accordance with the coding order to be employed, so that the compression rate of the coding is optimized for each of the coding order.

Also, according to the second embodiment of the present invention, the data transfer required for extracting the data of the floating reference pixel is conducted only once. Thus, a slow down of the coding processing speed is sustained at a minimum.

FIGS. 24A through 24H are illustrative drawings showing the coordinate of the floating reference pixel β according to an alternate example of the second embodiment when the bit-plane-by-bit-plane coding order is employed.

Figure 24A:
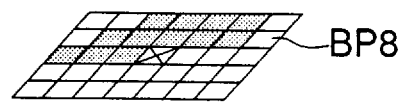
FIGS. 24A through 24H are illustrative drawings showing a coordinate of the floating reference pixel according to an alternate example of the second embodiment when the bit-plane-by-bit-plane coding order is employed.
Figure 24B:
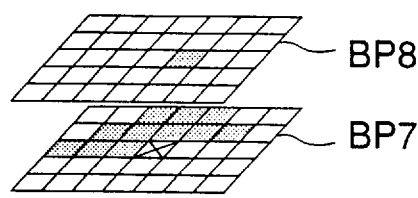
Figure 24C:
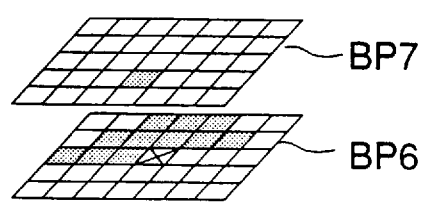
Figure 24D:
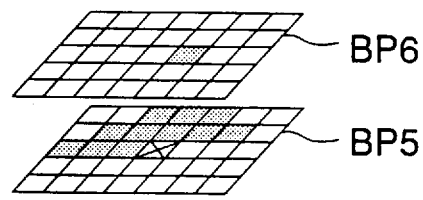
Figure 24E:
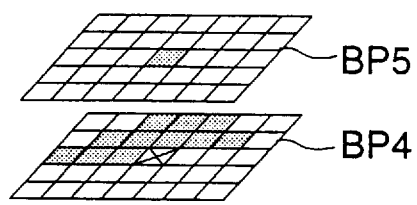
Figure 24F:
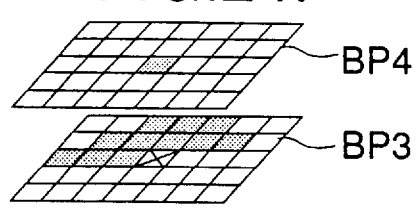
Figure 24G:
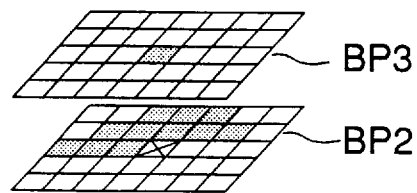
Figure 24H:
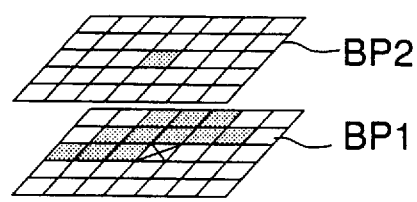

As shown in FIG. 24A, when the current pixel X belongs to the bit plane BP8, a pixel at a coordinate (x+2, y−2) of the bit plane BP8 is used as the floating reference pixel β. As shown in FIG. 24B, when the current pixel X belongs to the bit plane BP7, a pixel at a coordinate (x+1, y) of the bit plane BP8 is used as the floating reference pixel β. As shown in FIG. 24C, when the current pixel X belongs to the bit plane BP6, a pixel at a coordinate (x, y+1) of the bit plane BP7 is used as the floating reference pixel β. As shown in FIG. 24D, when the current pixel X belongs to the bit plane BP5, a pixel at a coordinate (x+1, y) of the bit plane BP6 is used as the floating reference pixel β. As shown in FIG. 24E, when the current pixel X belongs to the bit plane BP4, a pixel at a coordinate (x, y) of the bit plane BP5 is used as the floating reference pixel β. As shown in FIG. 24F, when the current pixel X belongs to the bit plane BP3, a pixel at a coordinate (x, y) of the bit plane BP4 is used as the floating reference pixel β. As shown in FIG. 24G, when the current pixel X belongs to the bit plane BP2, a pixel at a coordinate (x, y) of the bit plane BP3 is used as the floating reference pixel β. As shown in FIG. 24H, when the current pixel X belongs to the bit plane BP1, a pixel at a coordinate (x, y) of the bit plane BP2 is used as the floating reference pixel β.

Further, when the line-by-line coding order is employed, the coordinate of the floating reference pixel β is determined as follows. The determination of the coordinate of the floating reference pixel β is made experimentally rather than theoretically. That is, the floating reference pixel β is selected so that entropy of the image is lowest through such selection of the floating reference pixel under the condition that all the fixed reference pixels are already selected. An optimal coordinate of the floating reference pixel is determined in this manner for each of a set of typical images to statistically determine the coordinate of the floating reference pixel which should be optimal on average.

FIGS. 25A through 25H are illustrative drawings showing the coordinate of the floating reference pixel β according to an alternate example of the second embodiment when the line-by-line coding order is employed.

Figure 25A:
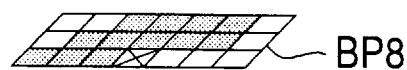
FIGS. 25A through 25H are illustrative drawings showing a coordinate of the floating reference pixel according to the alternate example of the second embodiment when the line-by-line coding order is employed.
Figure 25B:
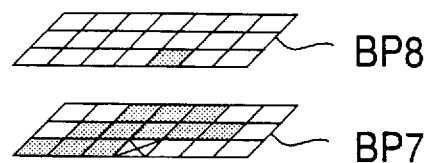
Figure 25C:
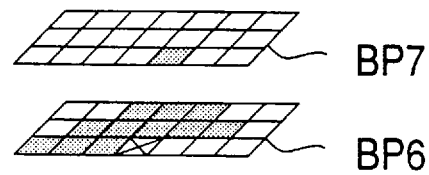
Figure 25D:
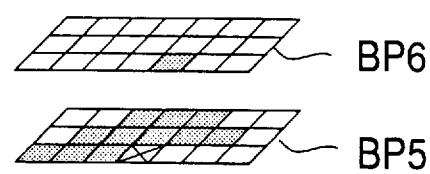
Figure 25E:
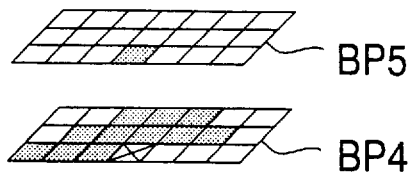
Figure 25F:
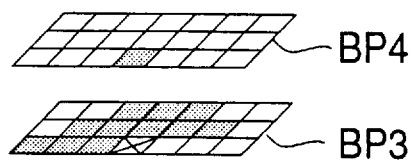
Figure 25G:
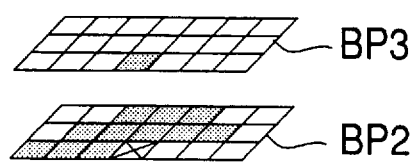
Figure 25H:
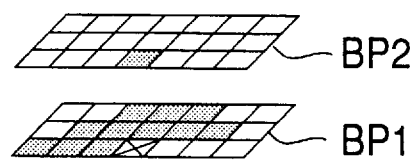

As shown in FIG. 25A, when the current pixel X belongs to the bit plane BP8, a pixel at a coordinate (x+2, y−2) of the bit plane BP8 is used as the floating reference pixel β. As shown in FIG. 25B, when the current pixel X belongs to the bit plane BP7, a pixel at a coordinate (x+1, y) of the bit plane BP8 is used as the floating reference pixel β. As shown in FIG. 25C, when the current pixel X belongs to the bit plane BP6, a pixel at a coordinate (x+1, y) of the bit plane BP7 is used as the floating reference pixel β. As shown in FIG. 25D, when the current pixel X belongs to the bit plane BP5, a pixel at a coordinate (x+1, y) of the bit plane BP6 is used as the floating reference pixel β. As shown in FIG. 25E, when the current pixel X belongs to the bit plane BP4, a pixel at a coordinate (x, y) of the bit plane BP5 is used as the floating reference pixel β. As shown in FIG. 25F, when the current pixel X belongs to the bit plane BP3, a pixel at a coordinate (x, y) of the bit plane BP4 is used as the floating reference pixel β. As shown in FIG. 25G, when the current pixel X belongs to the bit plane BP2, a pixel at a coordinate (x, y) of the bit plane BP3 is used as the floating reference pixel β. As shown in FIG. 25H, when the current pixel X belongs to the bit plane BP1, a pixel at a coordinate (x, y) of the bit plane BP2 is used as the floating reference pixel β.

Further, when the pixel-by-pixel coding order is employed, the coordinate of the floating reference pixel β is determined as follows. The determination of the coordinate of the floating reference pixel β is made experimentally rather than theoretically. That is, the floating reference pixel β is selected so that entropy of the image is lowest through such selection of the floating reference pixel under the condition that all the fixed reference pixels are already selected. An optimal coordinate of the floating reference pixel is determined in this manner for each of a set of typical images to statistically determine the coordinate of the floating reference pixel which should be optimal on average.

FIGS. 26A through 26H are illustrative drawings showing the coordinate of the floating reference pixel β according to an alternate example of the second embodiment when the pixel-by-pixel coding order is employed.

Figure 26A:
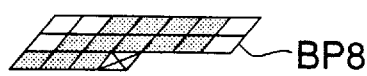
FIGS. 26A through 26H are illustrative drawings showing a coordinate of the floating reference pixel according to the alternate example of the second embodiment when the pixel-by-pixel coding order is employed.
Figure 26B:
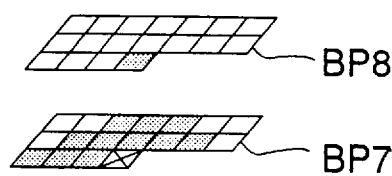
Figure 26C:
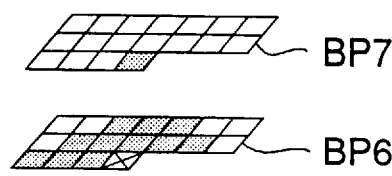
Figure 26D:
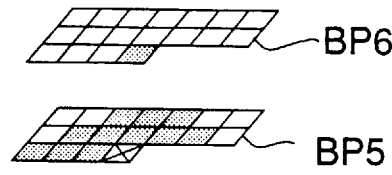
Figure 26E:
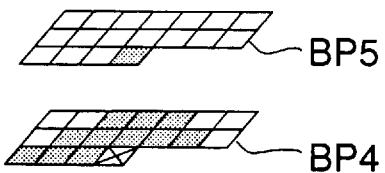
Figure 26F:
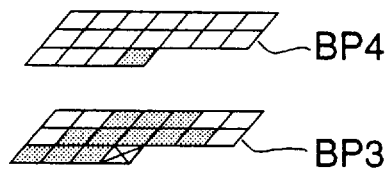
Figure 26G:
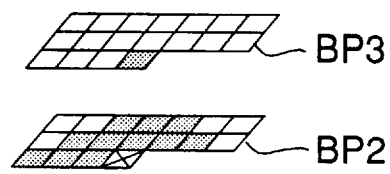
Figure 26H:
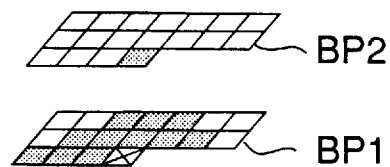

As shown in FIG. 26A, when the current pixel X belongs to the bit plane BP8, a pixel at a coordinate (x+2, y−2) of the bit plane BP8 is used as the floating reference pixel β. As shown in FIG. 26B, when the current pixel X belongs to the bit plane BP7, a pixel at a coordinate (x, y) of the bit plane BP8 is used as the floating reference pixel β. As shown in FIG. 26C, when the current pixel X belongs to the bit plane BP6, a pixel at a coordinate (x, y) of the bit plane BP7 is used as the floating reference pixel β. As shown in FIG. 26D, when the current pixel X belongs to the bit plane BP5, a pixel at a coordinate (x, y) of the bit plane BP6 is used as the floating reference pixel β. As shown in FIG. 26E, when the current pixel X belongs to the bit plane BP4, a pixel at a coordinate (x, y) of the bit plane BP5 is used as the floating reference pixel β. As shown in FIG. 26F, when the current pixel X belongs to the bit plane BP3, a pixel at a coordinate (x, y) of the bit plane BP4 is used as the floating reference pixel β. As shown in FIG. 26G, when the current pixel X belongs to the bit plane BP2, a pixel at a coordinate (x, y) of the bit plane BP3 is used as the floating reference pixel β. As shown in FIG. 26H, when the current pixel X belongs to the bit plane BP1, a pixel at a coordinate (x, y) of the bit plane BP2 is used as the floating reference pixel β.

According to experiments conducted by the inventor, improvements in entropy are observed in the variations of the second embodiment described above.

Figure 27:
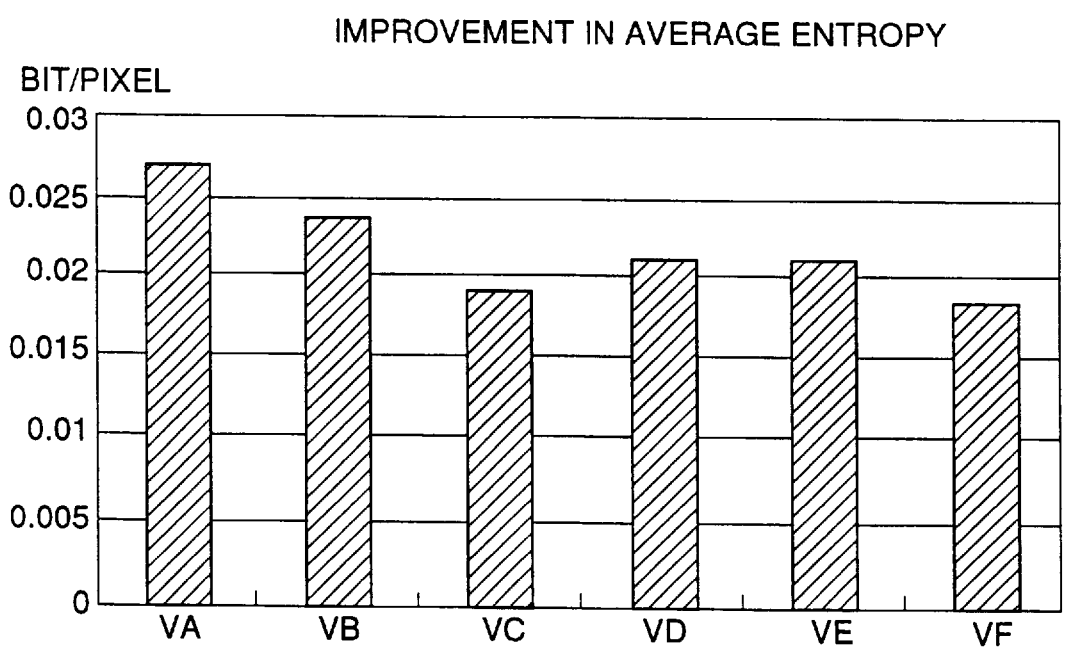
FIG. 27 is a chart showing an improvement in the average entropy for a set of images obtained by using each of the variations of the second embodiment over a corresponding average entropy obtained by use of the template of FIG. 20.

FIG. 27 is a chart showing the improvement in an average entropy for a set of images obtained by using each of the variations of the second embodiment over a corresponding average entropy obtained by use of the template of FIG. 20. In FIG. 27, an improvement in the average entropy per pixel over the use of the template of FIG. 20 is shown by each of the bars VA, VB, VC, VD, VE, and VF. Here, the bars VA, VB, VC, VD, VE, and VF correspond to FIGS. 21A through 21H, FIGS. 22A through 22H, FIGS. 23A through 23H, FIGS. 24A through 24H, FIGS. 25A through 25H, and FIGS. 26A through 26H.

In FIG. 27, the bar VD, for example, shows that the average entropy per pixel is improved (reduced) by about 0.02 bit when the templates of FIGS. 24A through 24H are used. As can be seen in FIG. 27, all the bars show some improvements in entropy per pixel over the use of the template of FIG. 20.

The above description of the first and second embodiments has been provided by taking a particular example in which a multi-level image comprised of 8 bits per pixel is coded. The present invention is not limited to this particular example, but can be applied to a case in which a multi-level image having 7 bits or fewer in each pixel is coded. In this case, a bit plane of the most significant bit through a bit plane of the least significant bit may be assigned to the bit planes of the first or second embodiment in the order of the bit plane BP8 being the most significant bit, the bit plane BP7 being the next bit to the most significant bit, and so on. In this manner, a selection of the floating reference pixel can be made in the same manner as in the first or second embodiment.

Namely, when one pixel is comprised of 4 bits, for example, the bit plane of the most significant bit through the bit plane of the least significant bit are assigned to the bit planes BP8 through BP5, respectively. Then, the floating reference pixel is selected in the same manner as in the first embodiment or in the second embodiment.

The decoding process can be conducted by carrying out an inverse process of the coding process.

As described above, according to the present invention, the multi-level-image data is converted into a gray code representation prior to the generation of the bit planes, and one of the reference pixels extracted by the template is a floating reference pixel variably selected from the bit plane of the current pixel or other bit planes depending on the situation. Therefore, the compression rate of the coding is enhanced, and, at the same time, the load of the data transfer process for extracting the floating reference pixel is relatively light to avoid a significant slowing down of the coding processing speed.

Also, when the coding process is carried out bit plane by bit plane, the selection of the fixed reference pixel and the floating reference pixel extracted by the templates are tailored to the bit-plane-by-bit-plane coding process. Therefore, the coding efficiency of the bit-plane-by-bit-plane coding process is significantly enhanced.

Also, when the coding process is carried out line by line, the selection of the fixed reference pixel and the floating reference pixel extracted by the templates are tailored to the line-by-line coding process. Therefore, the coding efficiency of the line-by-line coding process is significantly enhanced.

Also, when the coding process is carried out pixel by pixel, the selection of the fixed reference pixel and the floating reference pixel extracted by the templates are tailored to the pixel-by-pixel coding process. Therefore, the coding efficiency of the pixel-by-pixel coding process is significantly enhanced.

Also, according to the present invention, not only the multi-level-image data of 8 bits per pixel but also the multi-level-image data of fewer than 8 bits per pixel can be coded with an enhanced compression rate. This flexibility makes the coding device according to the present invention suitable for mass-manufacturing, thereby reducing the cost of the device.

Further, the present invention is not limited to these embodiments, but various variations and modifications may be made without departing from the scope of the present invention.

What is claimed is:

1. A device for coding a multi-level image by coding bit planes obtained from said multi-level image, said device comprising:

a gray-code-conversion unit converting said multi-level image into a gray-code representation;

a bit-plane generating unit generating said bit planes from said gray-code representation;

a data-reference unit extracting a current pixel and fixed reference pixels from a first one of said bit planes and extracting a floating reference pixel from a second one of said bit planes including said first one, said floating reference pixel having a varying position based on said bit plane in which said current pixel is positioned; and a coding unit coding a sequence of pixels extracted sequentially from said bit planes by using entropy coding, said entropy coding using as a coding parameter a probability of data occurrence of said current pixel, said probability of data occurrence being obtained based on said fixed reference pixels and said floating reference pixel.

2. The device as claimed in claim 1, wherein said entropy coding is an arithmetic coding.

3. The device as claimed in claim 1, wherein said fixed reference pixels having a fixed arrangement relative to a position of said current pixel.

4. The device as claimed in claim 3, wherein said second one of said bit planes and said varying position are determined based on both which one of said bit planes is said first one of said bit planes and an order in which said sequence of said pixels are sequentially extracted from said bit planes.

5. The device as claimed in claim 4, wherein a position of said floating reference pixel is determined such that entropy of said multi-level image is lowest through selection of said floating reference pixel under a condition that all said fixed reference pixels are already selected.

6. The device as claimed in claim 5, wherein said position of said floating reference pixel is determined statistically in advance by using a set of multi-level images.

7. A device for coding a multi-level image by coding bit planes obtained from said multi-level image, said device comprising:

a gray-code-conversion unit converting said multi-level image into a gray-code representation;

a bit-plane generating unit generating said bit planes from said gray-code representation;

a data-reference unit extracting a current pixel and fixed reference pixels from a first one of said bit planes and extracting a floating reference pixel from a second one of said bit planes including said first one; and a coding unit coding a sequence of pixels extracted sequentially from said bit planes by using entropy coding, said entropy coding using as a coding parameter a probability of data occurrence of said current pixel, said probability of data occurrence being obtained based on said fixed reference pixels and said floating reference pixel, wherein said fixed reference pixels have a fixed arrangement relative to a position of said current pixel, and said floating reference pixel has a varying position relative to said position of said current pixel, wherein said second one of said bit planes and said varying position are determined based on both which one of said bit planes is said first one of said bit planes and an order in which said sequence of said pixels are sequentially extracted from said bit planes, wherein said current pixel has a coordinate (x, y) with an x axis in a main scanning direction and a y axis in a sub scanning direction, and said bit planes comprise first through eighth bit planes with said first bit plane corresponding to a least significant bit of said multi-level image and said eighth bit plane corresponding to a most significant bit of said multi-level image, wherein said data-reference unit extracts said sequence of said pixels bit plane by bit plane, said fixed reference pixels being at coordinates of (x−1, y−2), (x, y−2), (x+1, y−2), (x−1, y−1), (x, y−1), (x+1, y−1), (x+2, y−1), (x−2, y), and (x−1, y) of said first one of said bit planes, said floating reference pixel being at a coordinate (x−2, y−1) of said eighth bit plane when said first one of said bit planes is said eighth bit plane, said floating reference pixel being at a coordinate (x+1, y) of said eighth bit plane when said first one of said bit planes is said seventh bit plane, said floating reference pixel being at a coordinate (x, y+1) of said seventh bit plane when said first one of said bit planes is said sixth bit plane, said floating reference pixel being at a coordinate (x, y+1) of said seventh bit plane when said first one of said bit planes is said fifth bit plane, said floating reference pixel being at a coordinate (x+1, y+1) of said seventh bit plane when said first one of said bit planes is said fourth bit plane, said floating reference pixel being at a coordinate (x+1, y+1) of said seventh bit plane when said first one of said bit planes is said third bit plane, said floating reference pixel being at a coordinate (x+1, y+1) of said seventh bit plane when said first one of said bit planes is said second bit plane, and said floating reference pixel being at a coordinate (x, y) of said second bit plane when said first one of said bit planes is said first bit plane.

8. A device for coding a multi-level image by coding bit planes obtained from said multi-level image, said device comprising:

a gray-code-conversion unit converting said multi-level image into a gray-code representation;

a bit-plane generating unit generating said bit planes from said gray-code representation;

a data-reference unit extracting a current pixel and fixed reference pixels from a first one of said bit planes and extracting a floating reference pixel from a second one of said bit planes including said first one; and a coding unit coding a sequence of pixels extracted sequentially from said bit planes by using entropy coding, said entropy coding using as a coding parameter a probability of data occurrence of said current pixel, said probability of data occurrence being obtained based on said fixed reference pixels and said floating reference pixel, wherein said fixed reference pixels have a fixed arrangement relative to a position of said current pixel, and said floating reference pixel has a varying position relative to said position of said current pixel, wherein said second one of said bit planes and said varying position are determined based on both which one of said bit planes is said first one of said bit planes and an order in which said sequence of said pixels are sequentially extracted from said bit planes, wherein said current pixel has a coordinate (x, y) with an x axis in a main scanning direction and a y axis in a sub scanning direction, and said bit planes comprise first through eighth bit planes with said first bit plane corresponding to a least significant bit of said multi-level image and said eighth bit plane corresponding to a most significant bit of said multi-level image, wherein said data-reference unit extracts said sequence of said pixels line by line, said fixed reference pixels being at coordinates of (x−1, y−2), (x, y−2), (x+1, y−2), (x−1, y−1), (x, y−1), (x+1, y−1), (x+2, y−1), (x−2, y), and (x−1, y) of said first one of said bit planes, said floating reference pixel being at a coordinate (x−2, y−1) of said eighth bit plane when said first one of said bit planes is said eighth bit plane, said floating reference pixel being at a coordinate (x+1, y) of the eighth bit plane when said first one of said bit planes is said seventh bit plane, said floating reference pixel being at a coordinate (x+1, y) of the seventh bit plane when said first one of said bit planes is said sixth bit plane, said floating reference pixel being at a coordinate (x+1, y) of the seventh bit plane when said first one of said bit planes is said fifth bit plane, said floating reference pixel being at a coordinate (x+1, y) of the seventh bit plane when said first one of said bit planes is said fourth bit plane, said floating reference pixel being at a coordinate (x, y) of the fifth bit plane when said first one of said bit planes is said third bit plane, said floating reference pixel being at a coordinate (x, y) of the third bit plane when said first one of said bit planes is said second bit plane, and said floating reference pixel being at a coordinate (x, y) of the second bit plane when said first one of said bit planes is said first bit plane.

9. A device for coding a multi-level image by coding bit planes obtained from said multi-level image, said device comprising:

a gray-code-conversion unit converting said multi-level image into a gray-code representation;

a bit-plane generating unit generating said bit planes from said gray-code representation;

a data-reference unit extracting a current pixel and fixed reference pixels from a first one of said bit planes and extracting a floating reference pixel from a second one of said bit planes including said first one; and a coding unit coding a sequence of pixels extracted sequentially from said bit planes by using entropy coding, said entropy coding using as a coding parameter a probability of data occurrence of said current pixel, said probability of data occurrence being obtained based on said fixed reference pixels and said floating reference pixel, wherein said fixed reference pixels have a fixed arrangement relative to a position of said current pixel, and said floating reference pixel has a varying position relative to said position of said current pixel, wherein said second one of said bit planes and said varying position are determined based on both which one of said bit planes is said first one of said bit planes and an order in which said sequence of said pixels are sequentially extracted from said bit planes, wherein said current pixel has a coordinate (x, y) with an x axis in a main scanning direction and a y axis in a sub scanning direction, and said bit planes comprise first through eighth bit planes with said first bit plane corresponding to a least significant bit of said multi-level image and said eighth bit plane corresponding to a most significant bit of said multi level image, wherein said data-reference unit extracts said sequence of said pixels pixel by pixel, said fixed reference pixels being at coordinates of (x−1, y−2), (x, y−2), (x+1, y−2), (x−1, y−1), (x, y−1), (x+1, y−1), (x+2, y−1), (x−2, y), and (x−1, y) of said first one of said bit planes, said floating reference pixel being at a coordinate (x−2, y−1) of said eighth bit plane when said first one of said bit planes is said eighth bit plane, said floating reference pixel being at a coordinate (x, y) of said eighth bit plane when said first one of said bit planes is said seventh bit plane, said floating reference pixel being at a coordinate (x−1, y) of said seventh bit plane when said first one of said bit planes is said sixth bit plane, said floating reference pixel being at a coordinate (x−1, y) of said seventh bit plane when said first one of said bit planes is said fifth bit plane, said floating reference pixel being at a coordinate (x−1, y) of said seventh bit plane when said first one of said bit planes is said fourth bit plane, said floating reference pixel being at a coordinate (x, y) of said seventh bit plane when said first one of said bit planes is said third bit plane, said floating reference pixel being at a coordinate (x, y) of said third bit plane when said first one of said bit planes is said second bit plane, and said floating reference pixel being at a coordinate (x, y) of said second bit plane when said first one of said bit planes is said first bit plane.

10. A device for coding a multi-level image by coding bit planes obtained from said multi-level image, said device comprising:

a gray-code-conversion unit converting said multi-level image into a gray-code representation;

a bit-plane generating unit generating said bit planes from said gray-code representation;

a data-reference unit extracting a current pixel and fixed reference pixels from a first one of said bit planes and extracting a floating reference pixel from a second one of said bit planes including said first one; and a coding unit coding a sequence of pixels extracted sequentially from said bit planes by using entropy coding, said entropy coding using as a coding parameter a probability of data occurrence of said current pixel, said probability of data occurrence being obtained based on said fixed reference pixels and said floating reference pixel, wherein said fixed reference pixels have a fixed arrangement relative to a position of said current pixel, and said floating reference pixel has a varying position relative to said position of said current pixel, wherein said second one of said bit planes and said varying position are determined based on both which one of said bit planes is said first one of said bit planes and an order in which said sequence of said pixels are sequentially extracted from said bit planes, wherein said current pixel has a coordinate (x, y) with an x axis in a main scanning direction and a y axis in a sub scanning direction, and said bit planes comprise first through eighth bit planes with said first bit plane corresponding to a least significant bit of said multi-level image and said eighth bit plane corresponding to a most significant bit of said multi-level image, wherein said data-reference unit extracts said sequence of said pixels bit plane by bit plane, said fixed reference pixels being at coordinates of (x−1, y−2), (x, y−2), (x+1, y−2), (x−1, y−1), (x, y−1), (x+1, y−1), (x+2, y−1), (x−2, y), and (x−1, y) of said first one of said bit planes, said floating reference pixel being at a coordinate (x−2, y−1) of said eighth bit plane when said first one of said bit planes is said eighth bit plane, said floating reference pixel being at a coordinate (x+1, y) of said eighth bit plane when said first one of said bit planes is said seventh bit plane, said floating reference pixel being at a coordinate (x, y+1) of said seventh bit plane when said first one of said bit planes is said sixth bit plane, said floating reference pixel being at a coordinate (x+1, y) of said sixth bit plane when said first one of said bit planes is said fifth bit plane, said floating reference pixel being at a coordinate (x, y) of said fifth bit plane when said first one of said bit planes is said fourth bit plane, said floating reference pixel being at a coordinate (x, y) of said fourth bit plane when said first one of said bit planes is said third bit plane, said floating reference pixel being at a coordinate (x, y) of said third bit plane when said first one of said bit planes is said second bit plane, and said floating reference pixel being at a coordinate (x, y) of said second bit plane when said first one of said bit planes is said first bit plane.

11. A device for coding a multi-level image by coding bit planes obtained from said multi-level image, said device comprising:

a gray-code-conversion unit converting said multi-level image into a gray-code representation;

a bit-plane generating unit generating said bit planes from said gray-code representation;

a data-reference unit extracting a current pixel and fixed reference pixels from a first one of said bit planes and extracting a floating reference pixel from a second one of said bit planes including said first one; and a coding unit coding a sequence of pixels extracted sequentially from said bit planes by using entropy coding, said entropy coding using as a coding parameter a probability of data occurrence of said current pixel, said probability of data occurrence being obtained based on said fixed reference pixels and said floating reference pixel, wherein said fixed reference pixels have a fixed arrangement relative to a position of said current pixel, and said floating reference pixel has a varying position relative to said position of said current pixel, wherein said second one of said bit planes and said varying position are determined based on both which one of said bit planes is said first one of said bit planes and an order in which said sequence of said pixels are sequentially extracted from said bit planes, wherein said current pixel has a coordinate (x, y) with an x axis in a main scanning direction and a y axis in a sub scanning direction, and said bit planes comprise first through eighth bit planes with said first bit plane corresponding to a least significant bit of said multi-level image and said eighth bit plane corresponding to a most significant bit of said multi-level image, wherein said data-reference unit extracts said sequence of said pixels line by line, said fixed reference pixels being at coordinates of (x−1, y−2), (x, y−2), (x+1, y−2), (x−1, y−1), (x, y−1), (x+1, y−1), (x+2, y−1), (x−2, y), and (x−1, y) of said first one of said bit planes, said floating reference pixel being at a coordinate (x−2, y−1) of said eighth bit plane when said first one of said bit planes is said eighth bit plane, said floating reference pixel being at a coordinate (x+1, y) of said eighth bit plane when said first one of said bit planes is said seventh bit plane, said floating reference pixel being at a coordinate (x+1, y) of said seventh bit plane when said first one of said bit planes is said sixth bit plane, said floating reference pixel being at a coordinate (x+1, y) of said sixth bit plane when said first one of said bit planes is said fifth bit plane, said floating reference pixel being at a coordinate (x, y) of said fifth bit plane when said first one of said bit planes is said fourth bit plane, said floating reference pixel being at a coordinate (x, y) of said fourth bit plane when said first one of said bit planes is said third bit plane, said floating reference pixel being at a coordinate (x, y) of said third bit plane said first one of said bit planes is said second bit plane, and said floating reference pixel being at a coordinate (x, y) of said second bit plane when said first one of said bit planes is said first bit plane.

12. A device for coding a multi-level image by coding bit planes obtained from said multi-level image, said device comprising:

a gray-code-conversion unit converting said multi-level image into a gray-code representation;

a bit-plane generating unit generating said bit planes from said gray-code representation;

a data-reference unit extracting a current pixel and fixed reference pixels from a first one of said bit planes and extracting a floating reference pixel from a second one of said bit planes including said first one; and a coding unit coding a sequence of pixels extracted sequentially from said bit planes by using entropy coding, said entropy coding using as a coding parameter a probability of data occurrence of said current pixel, said probability of data occurrence being obtained based on said fixed reference pixels and said floating reference pixel, wherein said fixed reference pixels have a fixed arrangement relative to a position of said current pixel, and said floating reference pixel has a varying position relative to said position of said current pixel, wherein said second one of said bit planes and said varying position are determined based on both which one of said bit planes is said first one of said bit planes and an order in which said sequence of said pixels are sequentially extracted from said bit planes, wherein said current pixel has a coordinate (x, y) with an x axis in a main scanning direction and a y axis in a sub scanning direction, and said bit planes comprise first through eighth bit planes with said first bit plane corresponding to a least significant bit of said multi-level image and said eighth bit plane corresponding to a most significant bit of said multi-level image, wherein said data-reference unit extracts said sequence of said pixels pixel by pixel, said fixed reference pixels being at coordinates of (x−1, y−2), (x, y−2), (x+1, y−2), (x−1, y−1), (x, y−1), (x+1, y−1), (x+2, y−1), (x−2, y), and (x−1, y) of said first one of said bit planes, said floating reference pixel being at a coordinate (x−2, y−1) of said eighth bit plane when said first one of said bit planes is said eighth bit plane, said floating reference pixel being at a coordinate (x, y) of said eighth bit plane when said first one of said bit planes is said seventh bit plane, said floating reference pixel being at a coordinate (x−1, y) of said seventh bit plane when said first one of said bit planes is said sixth bit plane, said floating reference pixel being at a coordinate (x, y) of said sixth bit plane when said first one of said bit planes is said fifth bit plane, said floating reference pixel being at a coordinate (x, y) of said fifth bit plane when said first one of said bit planes is said fourth bit plane, said floating reference pixel being at a coordinate (x, y) of said fourth bit plane when said first one of said bit planes is said third bit plane, said floating reference pixel being at a coordinate (x, y) of said third bit plane when said first one of said bit planes is said second bit plane, and said floating reference pixel being at a coordinate (x, y) of said second bit plane when said first one of said bit planes is said first bit plane.

13. A device for coding a multi-level image by coding bit planes obtained from said multi-level image, said device comprising:

a gray-code-conversion unit converting said multi-level image into a gray-code representation;

a bit-plane generating unit generating said bit planes from said gray-code representation;

a data-reference unit extracting a current pixel and fixed reference pixels from a first one of said bit planes and extracting a floating reference pixel from a second one of said bit planes including said first one; and a coding unit coding a sequence of pixels extracted sequentially from said bit planes by using entropy coding, said entropy coding using as a coding parameter a probability of data occurrence of said current pixel, said probability of data occurrence being obtained based on said fixed reference pixels and said floating reference pixel, wherein said fixed reference pixels have a fixed arrangement relative to a position of said current pixel, and said floating reference pixel has a varying position relative to said position of said current pixel, wherein said second one of said bit planes and said varying position are determined based on both which one of said bit planes is said first one of said bit planes and an order in which said sequence of said pixels are sequentially extracted from said bit planes, wherein said current pixel has a coordinate (x, y) with an x axis in a main scanning direction and a y axis in a sub scanning direction, and said bit planes comprise first through eighth bit planes with said first bit plane corresponding to a least significant bit of said multi-level image and said eighth bit plane corresponding to a most significant bit of said multi-level image, wherein said data-reference unit extracts said sequence of said pixels bit plane by bit plane, said fixed reference pixels being at coordinates of (x−1, y−2), (x, y−2), (x+1, y−2), (x−2, y−1), (x−1, y−1), (x, y−1), (x+1, y−1), (x+2, y−1), (x−3, y), (x−2, y), and (x−1, y) of said first one of said bit planes, said floating reference pixel being at a coordinate (x+2, y−2) of said eighth bit plane when said first one of said bit planes is said eighth bit plane, said floating reference pixel being at a coordinate (x+1, y) of said eighth bit plane when said first one of said bit planes is said seventh bit plane, said floating reference pixel being at a coordinate (x, y+1) of said seventh bit plane when said first one of said bit planes is said sixth bit plane, said floating reference pixel being at a coordinate (x, y+1) of said seventh bit plane when said first one of said bit planes is said fifth bit plane, said floating reference pixel being at a coordinate (x+1, y+1) of said seventh bit plane when said first one of said bit planes is said fourth bit plane, said floating reference pixel being at a coordinate (x+1, y+1) of said seventh bit plane when said first one of said bit planes is said third bit plane, said floating reference pixel being at a coordinate (x, y) of said third bit plane when said first one of said bit planes is said second bit plane, and said floating reference pixel being at a coordinate (x, y) of said second bit plane when said first one of said bit planes is said first bit plane.

14. A device for coding a multi-level image by coding bit planes obtained from said multi-level image, said device comprising:

a gray-code-conversion unit converting said multi-level image into a gray-code representation;

a bit-plane generating unit generating said bit planes from said gray-code representation;

a data-reference unit extracting a current pixel and fixed reference pixels from a first one of said bit planes and extracting a floating reference pixel from a second one of said bit planes including said first one; and a coding unit coding a sequence of pixels extracted sequentially from said bit planes by using entropy coding, said entropy coding using as a coding parameter a probability of data occurrence of said current pixel, said probability of data occurrence being obtained based on said fixed reference pixels and said floating reference pixel, wherein said fixed reference pixels have a fixed arrangement relative to a position of said current pixel, and said floating reference pixel has a varying position relative to said position of said current pixel, wherein said second one of said bit planes and said varying position are determined based on both which one of said bit planes is said first one of said bit planes and an order in which said sequence of said pixels are sequentially extracted from said bit planes, wherein said current pixel has a coordinate (x, y) with an x axis in a main scanning direction and a y axis in a sub scanning direction, and said bit planes comprise first through eighth bit planes with said first bit plane corresponding to a least significant bit of said multi-level image and said eighth bit plane corresponding to a most significant bit of said multi-level image, wherein said data-reference unit extracts said sequence of said pixels line by line, said fixed reference pixels being at coordinates of (x−1, y−2), (x, y−2), (x+1, y−2), (x−2, y−1), (x−1, y−1), (x, y−1), (x+1, y−1), (x+2, y−1), (x−3, y), (x−2, y), and (x−1, y) of said first one of said bit planes, said floating reference pixel being at a coordinate (x+2, y−2) of said eighth bit plane when said first one of said bit planes is said eighth bit plane, said floating reference pixel being at a coordinate (x+1, y) of said eighth bit plane when said first one of said bit planes is said seventh bit plane, said floating reference pixel being at a coordinate (x+1, y) of said seventh bit plane when said first one of said bit planes is said sixth bit plane, said floating reference pixel being at a coordinate (x+1, y) of said seventh bit plane when said first one of said bit planes is said fifth bit plane, said floating reference pixel being at a coordinate (x+1, y) of said seventh bit plane when said first one of said bit planes is said fourth bit plane, said floating reference pixel being at a coordinate (x+1, y) of said seventh bit plane when said first one of said bit planes is said third bit plane, said floating reference pixel being at a coordinate (x, y) of said third bit plane when said first one of said bit planes is said second bit plane, and said floating reference pixel being at a coordinate (x, y) of said second bit plane when said first one of said bit planes is said first bit plane.

15. A device for coding a multi-level image by coding bit planes obtained from said multi-level image, said device comprising:

a gray-code-conversion unit converting said multi-level image into a gray-code representation;

a bit-plane generating unit generating said bit planes from said gray-code representation;

a data-reference unit extracting a current pixel and fixed reference pixels from a first one of said bit planes and extracting a floating reference pixel from a second one of said bit planes including said first one; and a coding unit coding a sequence of pixels extracted sequentially from said bit planes by using entropy coding, said entropy coding using as a coding parameter a probability of data occurrence of said current pixel, said probability of data occurrence being obtained based on said fixed reference pixels and said floating reference pixel, wherein said fixed reference pixels have a fixed arrangement relative to a position of said current pixel, and said floating reference pixel has a varying position relative to said position of said current pixel, wherein said second one of said bit planes and said varying position are determined based on both which one of said bit planes is said first one of said bit planes and an order in which said sequence of said pixels are sequentially extracted from said bit planes, wherein said current pixel has a coordinate (x, y) with an x axis in a main scanning direction and a y axis in a sub scanning direction, and said bit planes comprise first through eighth bit planes with said first bit plane corresponding to a least significant bit of said multi-level image and said eighth bit plane corresponding to a most significant bit of said multi-level image, wherein said data-reference unit extracts said sequence of said pixels pixel by pixel, said fixed reference pixels being at coordinates of (x−1, y−2), (x, y−2), (x+1, y−2), (x−2, y−1), (x−1, y−1), (x, y−1), (x+1, y−1), (x+2, y−1), (x−3, y), (x−2, y), and (x−1, y) of said first one of said bit planes, said floating reference pixel being at a coordinate (x+2, y−2) of said eighth bit plane when said first one of said bit planes is said eighth bit plane, said floating reference pixel being at a coordinate (x, y) of said eighth bit plane when said first one of said bit planes is said seventh bit plane, said floating reference pixel being at a coordinate (x, y) of said seventh bit plane when said first one of said bit planes is said sixth bit plane, said floating reference pixel being at a coordinate (x−1, y) of said seventh bit plane when said first one of said bit planes is said fifth bit plane, said floating reference pixel being at a coordinate (x, y) of said fifth bit plane when said first one of said bit planes is said fourth bit plane, said floating reference pixel being at a coordinate (x, y) of said fifth bit plane when said first one of said bit planes is said third bit plane, said floating reference pixel being at a coordinate (x, y) of said third bit plane when said first one of said bit planes is said second bit plane, and said floating reference pixel being at a coordinate (x, y) of said second bit plane when said first one of said bit planes is said first bit plane.

16. A device for coding a multi-level image by coding bit planes obtained from said multi-level image, said device comprising:

a gray-code-conversion unit converting said multi-level image into a gray-code representation;

a bit-plane generating unit generating said bit planes from said gray-code representation;

a data-reference unit extracting a current pixel and fixed reference pixels from a first one of said bit planes and extracting a floating reference pixel from a second one of said bit planes including said first one; and a coding unit coding a sequence of pixels extracted sequentially from said bit planes by using entropy coding, said entropy coding using as a coding parameter a probability of data occurrence of said current pixel, said probability of data occurrence being obtained based on said fixed reference pixels and said floating reference pixel, wherein said fixed reference pixels have a fixed arrangement relative to a position of said current pixel, and said floating reference pixel has a varying position relative to said position of said current pixel, wherein said second one of said bit planes and said varying position are determined based on both which one of said bit planes is said first one of said bit planes and an order in which said sequence of said pixels are sequentially extracted from said bit planes, wherein said current pixel has a coordinate (x, y) with an x axis in a main scanning direction and a y axis in a sub scanning direction, and said bit planes comprise first through eighth bit planes with said first bit plane corresponding to a least significant bit of said multi-level image and said eighth bit plane corresponding to a most significant bit of said multi-level image, wherein said data-reference unit extracts said sequence of said pixels bit plane by bit plane, said fixed reference pixels being at coordinates of (x−1, y−2), (x, y−2), (x+1, y−2), (x−2, y−1), (x−1, y−1), (x, y−1), (x+1, y−1), (x+2, y−1), (x−3, y), (x−2, y), and (x−1, y) of said first one of said bit planes, said floating reference pixel being at a coordinate (x+2, y−2) of said eighth bit plane when said first one of said bit planes is said eighth bit plane, said floating reference pixel being at a coordinate (x+1, y) of said eighth bit plane when said first one of said bit planes is said seventh bit plane, said floating reference pixel being at a coordinate (x, y+1) of said seventh bit plane when said first one of said bit planes is said sixth bit plane, said floating reference pixel being at a coordinate (x+1, y) of said sixth bit plane when said first one of said bit planes is said fifth bit plane, said floating reference pixel being at a coordinate (x, y) of said fifth bit plane when said first one of said bit planes is said fourth bit plane, said floating reference pixel being at a coordinate (x, y) of said fourth bit plane when said first one of said bit planes is said third bit plane, said floating reference pixel being at a coordinate (x, y) of said third bit plane when said first one of said bit planes is said second bit plane, and said floating reference pixel being at a coordinate (x, y) of said second bit plane when said first one of said bit planes is said first bit plane.

17. A device for coding a multi-level image by coding bit planes obtained from said multi-level image, said device comprising:

a gray-code-conversion unit converting said multi-level image into a gray-code representation;

a bit-plane generating unit generating said bit planes from said gray-code representation;

a data-reference unit extracting a current pixel and fixed reference pixels from a first one of said bit planes and extracting a floating reference pixel from a second one of said bit planes including said first one; and a coding unit coding a sequence of pixels extracted sequentially from said bit planes by using entropy coding, said entropy coding using as a coding parameter a probability of data occurrence of said current pixel, said probability of data occurrence being obtained based on said fixed reference pixels and said floating reference pixel, wherein said fixed reference pixels have a fixed arrangement relative to a position of said current pixel, and said floating reference pixel has a varying position relative to said position of said current pixel, wherein said second one of said bit planes and said varying position are determined based on both which one of said bit planes is said first one of said bit planes and an order in which said sequence of said pixels are sequentially extracted from said bit planes, wherein said current pixel has a coordinate (x, y) with an x axis in a main scanning direction and a y axis in a sub scanning direction, and said bit planes comprise first through eighth bit planes with said first bit plane corresponding to a least significant bit of said multi-level image and said eighth bit plane corresponding to a most significant bit of said multi-level image, wherein said data-reference unit extracts said sequence of said pixels line by line, said fixed reference pixels being at coordinates of (x−1, y−2), (x, y−2), (x+1, y−2), (x−2, y−1), (x−1, y−1), (x, y−1), (x+1, y−1), (x+2, y−1), (x−3, y), (x−2, y), and (x−1, y) of said first one of said bit planes, said floating reference pixel being at a coordinate (x+2, y−2) of said eighth bit plane when said first one of said bit planes is said eighth bit plane, said floating reference pixel being at a coordinate (x+1, y) of said eighth bit plane when said first one of said bit planes is said seventh bit plane, said floating reference pixel being at a coordinate (x+1, y) of said seventh bit plane when said first one of said bit planes is said sixth bit plane, said floating reference pixel being at a coordinate (x+1, y) of said sixth bit plane when said first one of said bit planes is said fifth bit plane, said floating reference pixel being at a coordinate (x, y) of said fifth bit plane when said first one of said bit planes is said fourth bit plane, said floating reference pixel being at a coordinate (x, y) of said fourth bit plane when said first one of said bit planes is said third bit plane, said floating reference pixel being at a coordinate (x, y) of said third bit plane when said first one of said bit planes is said second bit plane, and said floating reference pixel being at a coordinate (x, y) of said second bit plane when said first one of said bit planes is said first bit plane.

18. A device for coding a multi-level image by coding bit planes obtained from said multi-level image, said device comprising:

a gray-code-conversion unit converting said multi-level image into a gray-code representation;

a bit-plane generating unit generating said bit planes from said gray-code representation;

a data-reference unit extracting a current pixel and fixed reference pixels from a first one of said bit planes and extracting a floating reference pixel from a second one of said bit planes including said first one; and a coding unit coding a sequence of pixels extracted sequentially from said bit planes by using entropy coding, said entropy coding using as a coding parameter a probability of data occurrence of said current pixel, said probability of data occurrence being obtained based on said fixed reference pixels and said floating reference pixel, wherein said fixed reference pixels have a fixed arrangement relative to a position of said current pixel, and said floating reference pixel has a varying position relative to said position of said current pixel, wherein said second one of said bit planes and said varying position are determined based on both which one of said bit planes is said first one of said bit planes and an order in which said sequence of said pixels are sequentially extracted from said bit planes, wherein said current pixel has a coordinate (x, y) with an x axis in a main scanning direction and a y axis in a sub scanning direction, and said bit planes comprise first through eighth bit planes with said first bit plane corresponding to a least significant bit of said multi-level image and said eighth bit plane corresponding to a most significant bit of said multi-level image, wherein said data-reference unit extracts said sequence of said pixels pixel by pixel, said fixed reference pixels being at coordinates of (x−1, y−2), (x, y−2), (x+1, y−2), (x−2, y−1), (x−1, y−1), (x, y−1), (x+1, y−1), (x+2, y−1), (x−3, y), (x−2, y), and (x−1, y) of said first one of said bit planes, said floating reference pixel being at a coordinate (x+2, y−2) of said eighth bit plane when said first one of said bit planes is said eighth bit plane, said floating reference pixel being at a coordinate (x, y) of said eighth bit plane when said first one of said bit planes is said seventh bit plane, said floating reference pixel being at a coordinate (x, y) of said seventh bit plane when said first one of said bit planes is said sixth bit plane, said floating reference pixel being at a coordinate (x, y) of said sixth bit plane when said first one of said bit planes is said fifth bit plane, said floating reference pixel being at a coordinate (x, y) of said fifth bit plane when said first one of said bit planes is said fourth bit plane, said floating reference pixel being at a coordinate (x, y) of said fourth bit plane when said first one of said bit planes is said third bit plane, said floating reference pixel being at a coordinate (x, y) of said third bit plane when said first one of said bit planes is said second bit plane, and said floating reference pixel being at a coordinate (x, y) of said second bit plane when said first one of said bit planes is said first bit plane.

19. A method of coding bit planes representing a multi-level image by a gray-code representation, said method comprising the steps of:

extracting a sequence of pixels sequentially from said bit planes in a predetermined order;

extracting fixed reference pixels from the same one of said bit planes as that of a current pixel, said fixed reference pixels having a fixed arrangement relative to a position of said current pixel;

extracting a floating reference pixel from one of said bit planes, said floating reference pixel having a varying position based on said bit plane in which said current pixel is positioned, said one of said bit planes and said varying position being determined based on both said predetermined order and which one of said bit planes said current pixel is extracted from; and coding said sequence of said pixels by using entropy coding, said entropy coding using as a coding parameter a probability of data occurrence of said current pixel, said probability of data occurrence being obtained based on said fixed reference pixels and said floating reference pixel.

20. The method as claimed in claim 19, wherein said entropy coding is an arithmetic coding.

21. The method as claimed in claim 19, further comprising a step of determining a position of said floating reference pixel so that entropy of said multi-level image is lowest through selection of said floating reference pixel under a condition that all said fixed reference pixels are already selected.

22. The device as claimed in claim 21, wherein said step of determining said position of said floating reference pixel further comprises a step of statistically determining said position of said floating reference pixel in advance by using a set of multi-level images.

* * * * *